(12) United States Patent
Baek et al.

(10) Patent No.: US 12,512,983 B2
(45) Date of Patent: Dec. 30, 2025

(54) METHOD AND DEVICE FOR CONTROLLING ELECTRONIC DEVICE FOR FEDERATED LEARNING

(71) Applicant: SAMSUNG ELECTRONICS CO., LTD., Suwon-si (KR)

(72) Inventors: Chunghun Baek, Suwon-si (KR); Sungwook Kim, Suwon-si (KR); Soohyung Kim, Suwon-si (KR); Dongkyun Nam, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 638 days.

(21) Appl. No.: 17/986,519

(22) Filed: Nov. 14, 2022

(65) Prior Publication Data

US 2023/0076024 A1 Mar. 9, 2023

Related U.S. Application Data

(63) Continuation of application No. PCT/KR2020/016832, filed on Nov. 25, 2020.

(30) Foreign Application Priority Data

May 13, 2020 (KR) .................. 10-2020-0057185

(51) Int. Cl.
*H04L 9/08* (2006.01)
*G06N 20/00* (2019.01)
*H04L 9/30* (2006.01)

(52) U.S. Cl.
CPC ........... *H04L 9/0894* (2013.01); *G06N 20/00* (2019.01); *H04L 9/088* (2013.01); *H04L 9/30* (2013.01)

(58) Field of Classification Search
CPC ......... H04L 9/0894; H04L 9/088; H04L 9/30; H04L 2209/42; H04L 9/0825;
(Continued)

(56) References Cited

U.S. PATENT DOCUMENTS

| 8,281,121 | B2 | 10/2012 | Nath et al. |
| 8,555,400 | B2 | 10/2013 | Shi et al. |

(Continued)

FOREIGN PATENT DOCUMENTS

| CN | 111091199 A | 5/2020 |
| JP | 2009-532740 A | 9/2009 |

(Continued)

OTHER PUBLICATIONS

Communication dated Feb. 23, 2021, issued by the International Searching Authority in counterpart International Application No. PCT/KR2020/016832 (PCT/ISA/220 and PCT/ISA/210).

(Continued)

*Primary Examiner* — Michael Won
(74) *Attorney, Agent, or Firm* — Sughrue Mion, PLLC

(57) ABSTRACT

Embodiments of the disclosure relate to an electronic device and a server for federated learning, and a method of the same. A method of refining a core artificial intelligence (AI) model built in the server includes transmitting, to each of a plurality of electronic devices performing federated learning with the core AI model, data for requesting transmission of first data used for refining the core AI model, receiving first data from at least one of the plurality of electronic devices, identifying an electronic device that has transmitted the first data from among the plurality of electronic devices, transmitting data for requesting transmission of second data to the electronic device that has transmitted the first data among the plurality of electronic devices, receiving second data from the electronic device that has transmitted the first (Continued)

data, and refining the core AI model by using the first data and the second data, wherein the first data includes first differential privacy protection data for protecting private data of each of the plurality of electronic devices, and the second data includes differential privacy modification data used to modify the first differential privacy protection data into second differential privacy protection data.

20 Claims, 14 Drawing Sheets

(58) Field of Classification Search
CPC . H04L 63/0414; H04L 67/1034; G06N 20/00; G06N 3/098; G06N 20/20
See application file for complete search history.

(56) References Cited

U.S. PATENT DOCUMENTS

| | | | |
|---|---|---|---|
| 8,880,867 B2 | 11/2014 | Jawurek et al. | |
| 10,223,547 B2 | 3/2019 | Rane et al. | |
| 10,270,599 B2 | 4/2019 | Nadeau et al. | |
| 10,970,402 B2 | 4/2021 | Verma et al. | |
| 11,373,115 B2 | 6/2022 | Kopp et al. | |
| 2007/0238075 A1 | 10/2007 | Mauch et al. | |
| 2018/0089587 A1 | 3/2018 | Suresh et al. | |
| 2018/0337899 A1 | 11/2018 | Becker et al. | |
| 2019/0012592 A1 | 1/2019 | Beser et al. | |
| 2019/0138934 A1 | 5/2019 | Prakash et al. | |
| 2019/0147188 A1 | 5/2019 | Benaloh et al. | |
| 2019/0163667 A1 | 5/2019 | Feuz et al. | |
| 2019/0171978 A1 | 6/2019 | Bonawitz | |
| 2019/0227980 A1 | 7/2019 | McMahan et al. | |
| 2019/0340534 A1 | 11/2019 | McMahan et al. | |
| 2020/0005071 A1 | 1/2020 | Kim et al. | |
| 2020/0027019 A1 | 1/2020 | Yang et al. | |
| 2020/0293887 A1* | 9/2020 | De Brouwer | G06N 3/084 |
| 2020/0311306 A1 | 10/2020 | Kim et al. | |
| 2020/0358599 A1* | 11/2020 | Baracaldo Angel | G06F 21/6227 |
| 2021/0073677 A1* | 3/2021 | Peterson | G06N 20/00 |
| 2021/0350211 A1* | 11/2021 | Dalli | G06N 3/08 |
| 2022/0318412 A1* | 10/2022 | Guo | G06F 17/18 |
| 2022/0374542 A1* | 11/2022 | Ghazi | G06F 21/6254 |

FOREIGN PATENT DOCUMENTS

| | | |
|---|---|---|
| JP | 6716424 B2 | 7/2020 |
| KR | 10-2019-0083845 A | 7/2019 |
| KR | 10-2019-0103088 A | 9/2019 |
| KR | 10-2019-0103090 A | 9/2019 |
| WO | 2017/187207 A1 | 11/2017 |

OTHER PUBLICATIONS

Communication dated Feb. 23, 2021, issued by the International Searching Authority in counterpart International Application No. PCT/KR2020/016832 (PCT/ISA/237).

Zhang et al., "Understanding Deep Learning Requires Re-Thinking Generalization," arXiv:1611.03530v2 [cs.LG], Feb. 2017, Total 15 pages.

Carlini et al., "The Secret Sharer: Evaluating and Testing Unintended Memorization in Neural Networks," arXiv:1802.08232v3 [cs.LG], Jul. 2019, Total 19 pages.

Shokri et al., "Membership Inference Attacks Against Machine Learning Models," arXiv:1610.05820v2 [cs.CR], Mar. 2017, Total 16 pages.

Abadi et al., "Deep Learning with Differential Privacy," arXiv:1607.00133v2 [stat.ML], Oct. 2016, Total 14 pages.

Rastogi et al., "Differentially Private Aggregation of Distributed Time-Series with Transformation and Encryption," SIGMOD'10, 2010, Total 12 pages.

Acs et al., "I have a DREAM! (DiffeRentially privatE smArt Metering)," 2011, Total 16 pages.

Shi et al., "Privacy-Preserving Aggregation of Time-Series Data," 2019, Total 17 pages.

Bonawitz et al., "Practical Secure Aggregation for Privacy-Preserving Machine Learning," 2017, Total 21 pages.

McMahan et al., "Learning Differentially Private Recurrent Language Models," ICLR, 2018, Total 14 pages.

Bonawitz et al., "Practical Secure Aggregation for Federated Learning on User-Held Data", 30th Conference on Neural Information Processing Systems (NIPS 2016), Nov. 14, 2016, 5 total pages, arXiv:1611.04482v1, doi:10.48550/arXiv.1611.04482.

Office Action dated Oct. 27, 2025, issued by Korean Patent Office in Korean Patent Application No. 10-2020-0057185.

* cited by examiner

METHOD AND DEVICE FOR CONTROLLING ELECTRONIC DEVICE FOR FEDERATED LEARNING

CROSS-REFERENCE TO RELATED APPLICATIONS

The present application is Bypass Continuation application of International Application No. PCT/KR2020/016832, filed on Nov. 25, 2020, which claims priority from Korean Patent Application No. 10-2020-0057185 filed on May 13, 2020, the entire contents of which are incorporated herein by reference.

BACKGROUND

1. Field

The present disclosure relates to an electronic device for performing federated learning and a method of controlling the electronic device.

2. Description of Related Art

An artificial intelligence (AI) system is a computer system that realizes human-level intelligence, and enables machines to become smart by learning and making decisions on their own, unlike existing rule-based smart systems. An AI system may improve its recognition rates and is capable of understanding a user's preferences more accurately through experience, and thus, existing rule-based smart systems are increasingly being replaced with deep learning-based AI systems.

AI technology consists of machine learning (deep learning) and element technologies using machine learning.

Machine learning is an algorithmic technology for autonomously classifying/learning features of input data, and element technologies are technologies using machine learning algorithms such as deep learning and include technical fields such as linguistic understanding, visual understanding, reasoning/prediction, knowledge representation, motion control, etc.

In machine learning, cloud machine learning has been mainly conducted in which a server receives raw data or pre-processed training data from a plurality of electronic devices and trains an AI model built in the server by using the received data.

Federated learning that is a more advanced form of cloud machine learning is also being conducted.

Federated learning refers to a machine learning technique that allows each of a plurality of electronic devices to train an AI model built in each of the plurality of electronic devices by using training data stored therein, and transmit only information about a change in a refined AI model to a server. A core AI model built in the server is refined using information about changes to AI models transmitted to a cloud. Furthermore, updates to the core AI model built in the server are transmitted to each of the plurality of electronic devices so that AI models respectively built in the plurality of electronic devices are also refined.

The federated learning where the raw data is not directly transmitted to the cloud has a benefit of protecting personal information of a user of each of the plurality of electronic devices. However, the federated learning has a problem in that when some of the plurality of electronic devices are disconnected (dropped out) from the server while transmitting data, personal information of users of the disconnected electronic devices may be leaked due to the dropout.

SUMMARY

The present disclosure relates to an electronic device and a method of controlling the electronic device for performing federated learning.

An embodiment of the disclosure relates to a method, performed by an electronic device for performing federated learning, of transmitting information about changes to an artificial intelligence (AI) model to a server.

In addition, another embodiment of the disclosure relates to a method, performed by an electronic device for performing federated learning, of generating information about changes to an AI model transmitted to a server.

Technical problems to be solved by the present embodiments are not limited to the technical problems as described above, and may also be applied to a method, performed by a server, of obtaining information about changes to the AI model from the electronic device.

In addition, other technical problems may be inferred from the following embodiments.

As a technical solution for solving the above-described technical problems, a method, performed by a server, of refining a core artificial intelligence (AI) model in the server may include transmitting, to each of a plurality of electronic devices performing federated learning with the core AI model, data for requesting first data used for refining the core AI model, receiving first data from at least one of the plurality of electronic devices, identifying an electronic device that transmitted the first data from among the plurality of electronic devices, transmitting data for requesting second data to the electronic device that transmitted the first data among the plurality of electronic devices, based on a result of the identifying, receiving second data from the electronic device that transmitted the first data, and refining the core AI model by using the first data and the second data, wherein the first data includes first differential privacy protection data for protecting private data of each of the plurality of electronic devices, and the second data includes differential privacy modification data used to modify the first differential privacy protection data into second differential privacy protection data, based on the result of the identifying.

Furthermore, the transmitting of the data for requesting the first data may include receiving pieces of identification information of the plurality of electronic devices respectively from the plurality of electronic devices, setting a noise level based on the received pieces of identification information, and transmitting information about the noise level to the plurality of electronic devices, and the first differential privacy protection data may be generated by each of the plurality of electronic devices, based on the noise level.

Furthermore, the information about the noise level may include information about a sum of pieces of first differential privacy protection data to be respectively received from the plurality of electronic devices, and the receiving of the first data may include receiving, from a first electronic device among the plurality of electronic devices, first differential privacy protection data of the first electronic device, which is generated by the first electronic device based on the information about the sum of the pieces of first differential privacy protection data and a weight value of the first electronic device.

Furthermore, the transmitting of the data for requesting the second data may include transmitting, to the first electronic device, identification information of the electronic device that transmitted the first data, and the receiving of the second data may include receiving, from the first electronic device, differential privacy modification data of the first electronic device, which is generated by the first electronic device based on the information about the sum of the pieces of first differential privacy protection data, the identification information of the electronic device that transmitted the first data, and the weight value of the first electronic device, and the sum of the pieces of first differential privacy protection data to be respectively received from the plurality of electronic devices may be equal to a sum of pieces of second differential privacy protection data obtained via modification using pieces of differential privacy modification data to be respectively received by the server from electronic devices that have transmitted the first data.

Furthermore, the receiving of the second data may include receiving, from the first electronic device, the differential privacy modification data that is a difference value between the second differential privacy protection data of the first electronic device and the first differential privacy protection data of the first electronic device.

Furthermore, the transmitting of the data for requesting the first data may include receiving a first public key from a first electronic device among the plurality of electronic devices and receiving a second public key from a second electronic device among the plurality of electronic devices, broadcasting the first public key and the second public key, receiving a first shared key from the first electronic device and receiving a second shared key from the second electronic device, and unicasting the first shared key to the second electronic device and unicasting the second shared key to the first electronic device, wherein the first shared key includes at least a portion of first masking data for protecting first private data of the first electronic device, and the second shared key includes at least a portion of second masking data for protecting second private data of the second electronic device, the receiving of the first data may include receiving the first masking data from the first electronic device and receiving the second masking data from the second electronic device, and the receiving of the second data may include receiving, from the first electronic device, first shared secure data generated based on the first shared key to remove the first masking data, and receiving, from the second electronic device, second shared secure data generated based on the second shared key to remove the second masking data.

Furthermore, the first shared key may include at least a portion of a secure key of the first electronic device, and the second shared key may include at least a portion of a secure key of the second electronic device. The receiving of the first data may include receiving, from the first electronic device, third masking data generated using a first secure key, and receiving, from the second electronic device, fourth masking data generated using a second secure key, and the receiving of the second data may include receiving, from the first electronic device, the first shared secure data generated based on the first shared key to remove the third masking data, and receiving, from the second electronic device, the second shared secure data generated based on the second shared key to remove the fourth masking data.

As a technical solution for solving the above-described technical problems, a server for performing federated learning with a plurality of electronic devices and in which a core AI model is built may include a communication interface, a memory storing one or more instructions, and a processor configured to execute the one or more instructions to control the communication interface to request transmission of first data used for refining the core AI model from each of the plurality of electronic devices and receive the first data from at least one of the plurality of electronic devices, identify an electronic device that transmitted the first data from among the plurality of electronic devices, control the communication interface to request, based on a result of the identifying, transmission of second data from the electronic device that transmitted the first data from among the plurality of electronic devices and receive the second data from the electronic device that transmitted the first data, and refine the core AI model by using the first data and the second data, wherein the first data includes first differential privacy protection data for protecting private data of each of the plurality of electronic devices, and the second data includes differential privacy modification data used to modify the first differential privacy protection data into second differential privacy protection data based on the result of the identifying.

The processor may be further configured to control the communication interface to receive pieces of identification information of the plurality of electronic devices respectively from the plurality of electronic devices, set a noise level based on the received pieces of identification information, and control the communication interface to transmit information about the noise level to the plurality of electronic devices, and the first differential privacy protection data may be generated by each of the plurality of electronic devices, based on the noise level.

Furthermore, the information about the noise level may include information about a sum of pieces of first differential privacy protection data to be respectively received from the plurality of electronic devices, and the processor may be further configured to control the communication interface to receive, from a first electronic device among the plurality of electronic devices, first differential privacy protection data of the first electronic device, which is generated by the first electronic device based on the information about the sum of the pieces of first differential privacy protection data and a weight value of the first electronic device.

The processor may be further configured to control the communication interface to transmit, to the first electronic device, identification information of the electronic device that transmitted the first data and receive, from the first electronic device, differential privacy modification data of the first electronic device, which is generated by the first electronic device based on the information about the sum of the pieces of first differential privacy protection data, the identification information of the electronic device that transmitted the first data, and the weight value of the first electronic device, and the sum of the pieces of first differential privacy protection data to be respectively received from the plurality of electronic devices may be equal to a sum of pieces of second differential privacy protection data obtained via modification using pieces of differential privacy modification data to be respectively received by the server from electronic devices that have transmitted the first data.

The processor may be further configured to control the communication interface to receive, from the first electronic device, the differential privacy modification data that is a difference value between the second differential privacy protection data of the first electronic device and the first differential privacy protection data of the first electronic device.

The processor may be further configured to control the communication interface to receive a first public key from a first electronic device among the plurality of electronic devices, receive a second public key from a second electronic device among the plurality of electronic devices, broadcast the first public key and the second public key, receive a first shared key from the first electronic device and receive a second shared key from the second electronic device, unicast the first shared key to the second electronic device, and unicast the second shared key to the first electronic device, wherein the first shared key includes at least a portion of first masking data for protecting first private data of the first electronic device, and the second shared key includes at least a portion of second masking data for protecting second private data of the second electronic device, and the processor may be further configured to receive first data including the first masking data from the first electronic device, receive second data including the second masking data from the second electronic device, receive, from the first electronic device, first shared secure data generated based on the first shared key to remove the first masking data, and receive, from the second electronic device, second shared secure data generated based on the second shared key to remove the second masking data.

Furthermore, the first shared key may include at least a portion of a secure key of the first electronic device, and the second shared key may include at least a portion of a secure key of the second electronic device, and the processor may be further configured to receive, from the first electronic device, first data including third masking data generated using a first secure key, receive, from the second electronic device, second data including fourth masking data generated using a second secure key, receive, from the first electronic device, the first shared secure data generated based on the first shared key to remove the third masking data, and receive, from the second electronic device, the second shared secure data generated based on the second shared key to remove the fourth masking data.

As a technical solution for solving the above-described technical problems, a method, performed by a first electronic device, of performing federated learning, the first electronic device being among a plurality of electronic devices that perform the federated learning with a core AI model built in a server, includes receiving, from the server, data for requesting first data used for refining the core AI model, transmitting, to the server, the first data of the first electronic device, the first data including first differential privacy protection data of the first electronic device for protecting private data of the first electronic device, receiving, from the server, data for requesting second data of the first electronic device, generating differential privacy modification data used to modify the first differential privacy protection data of the first electronic device into second differential privacy protection data of the first electronic device, based on a result of identifying an electronic device that transmitted the first data from among the plurality of electronic devices, and transmitting, to the server, the second data of the first electronic device, the second data including the differential privacy modification data of the first electronic device.

Furthermore, the receiving of the data for requesting the first data may include receiving information about a noise level set based on pieces of identification information of the plurality of electronic devices, wherein the information about the noise level includes information about a sum of pieces of first differential privacy protection data to be respectively received by the server from the plurality of electronic devices, and the transmitting of the first data may include generating the first differential privacy protection data of the first electronic device, based on the information about the sum of the pieces of first differential privacy protection data and a weight value of the first electronic device, and transmitting, to the server, the first data of the first electronic device, the first data including the first differential privacy protection data of the first electronic device.

Furthermore, the receiving of the data for requesting the second data may include receiving, from the server, identification information of the electronic device that transmitted the first data from among the plurality of electronic devices, the transmitting of the second data may include generating the differential privacy modification data of the first electronic device, based on the information about the sum of the pieces of first differential privacy protection data, the identification information of the electronic device that transmitted the first data, and the weight value of the first electronic device, and the sum of the pieces of first differential privacy protection data to be respectively received by the server from the plurality of electronic devices may be equal to a sum of pieces of second differential privacy protection data obtained via modification using pieces of differential privacy modification data to be respectively received by the server from the plurality of electronic devices.

As a technical solution for solving the above-described technical problems, a first electronic device among a plurality of electronic devices that perform federated learning with a core AI model built in a server may include a communication interface, a memory storing one or more instructions, and a processor configured to execute the one or more instructions to control the communication interface to receive, from the server, data for requesting first data used for refining the core AI model, transmit, to the server, the first data of the first electronic device, the first data including first differential privacy protection data of the first electronic device for protecting private data of the first electronic device, and receive, from the server, data for requesting second data of the first electronic device, generate differential privacy modification data used to modify the first differential privacy protection data of the first electronic device into second differential privacy protection data of the first electronic device, based on a result of identifying an electronic device that transmitted the first data from among the plurality of electronic devices, and control the communication interface to transmit, to the server, the second data of the first electronic device, the second data including the differential privacy modification data of the first electronic device.

The processor may be further configured to control the communication interface to receive the data for requesting the first data and receive information about a noise level set based on pieces of identification information of the plurality of electronic devices, wherein the information about the noise level includes information about a sum of pieces of first differential privacy protection data to be respectively received by the server from the plurality of electronic devices, generate the first differential privacy protection data of the first electronic device, based on the information about the sum of the pieces of first differential privacy protection data and a weight value of the first electronic device, and control the communication interface to transmit, to the server, the first data of the first electronic device, the first data including the first differential privacy protection data of the first electronic device.

The processor may be further configured to control the communication interface to receive, from the server, identification information of the electronic device that transmitted the first data from among the plurality of electronic devices, and generate the differential privacy modification data of the first electronic device, based on the information about the sum of the pieces of first differential privacy protection data, the identification information of the electronic device that transmitted the first data, and the weight value of the first electronic device, and the sum of the pieces of first differential privacy protection data to be respectively received by the server from the plurality of electronic devices may be equal to a sum of pieces of second differential privacy protection data obtained via modification using pieces of differential privacy modification data to be respectively received by the server from the plurality of electronic devices.

As a technical solution for solving the above-described technical problem, a computer-readable recording medium may have recorded thereon a program for executing, on a computer, at least one of the methods according to the embodiments of the disclosure.

As a technical solution for solving the above-described technical problem, an application stored in the recording medium may be for executing a function of at least one of the methods according to the embodiments of the disclosure.

DETAILED DESCRIPTION

Figure 1:
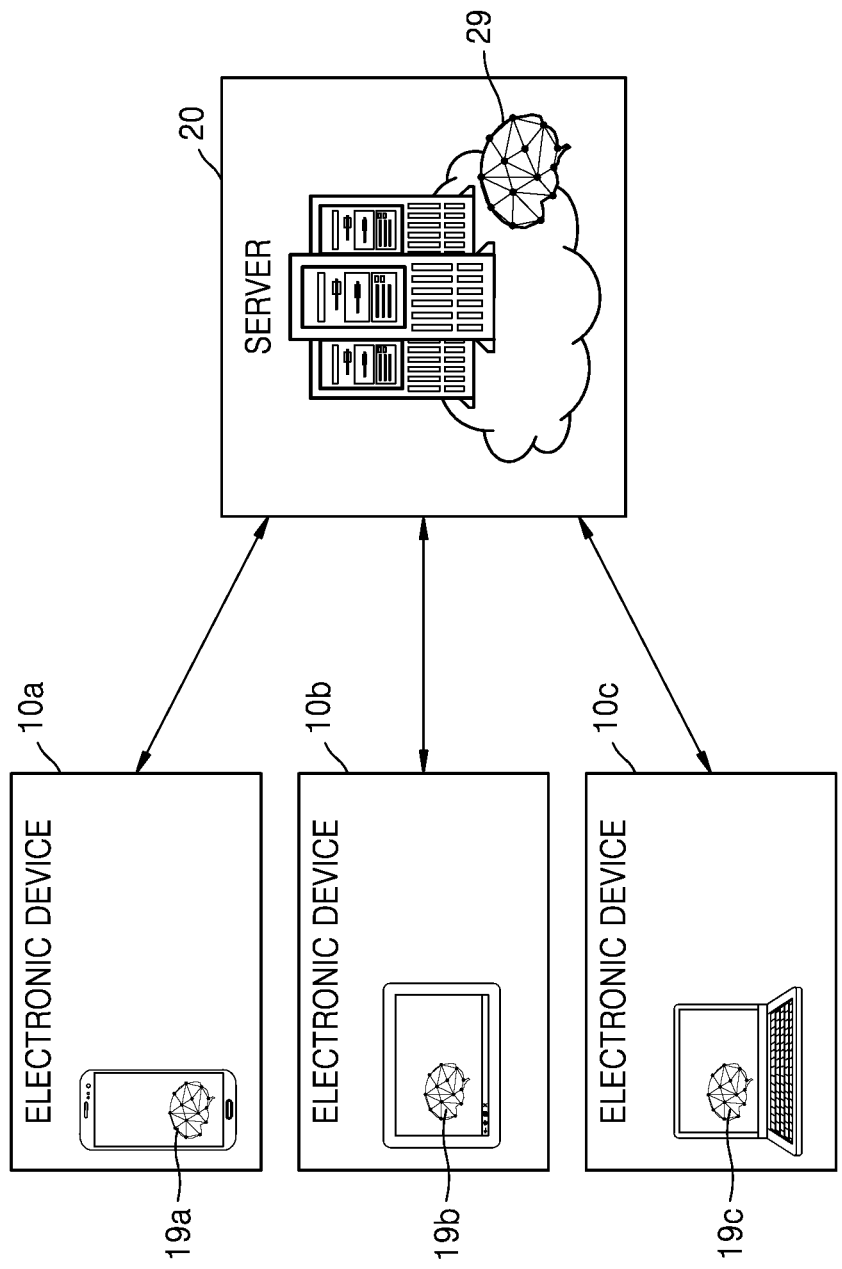
FIG. 1 is a diagram illustrating an example of a method by which a plurality of electronic devices and a server perform federated learning.

The present specification clarifies the scope of the present disclosure, and describes principles of the present disclosure and set forth embodiments so that one of ordinary skill in the art to which the present disclosure belongs may implement the present disclosure. The embodiments of the disclosure may be implemented in various forms.

Throughout the specification, like reference numerals denote like elements. This specification does not describe all elements of the embodiments, and descriptions of general matters in the art and repeated descriptions of embodiments are omitted. The term 'part' or 'portion' as used herein may be a hardware component such as a processor or circuit, and/or a software component executed by a hardware component such as a processor, and according to embodiments, a plurality of 'units' may be implemented as one unit or element. or one 'unit' may include a plurality of units or elements. Hereinafter, operation principles and embodiments of the present disclosure are described with reference to the accompanying drawings.

Some embodiments of the present disclosure may be described in terms of functional block components and various processing operations. Some or all of such functional blocks may be implemented by any number of hardware and/or software components that execute specific functions. For example, functional blocks of the present disclosure may be implemented by one or more microprocessors or by circuit components for performing certain functions. Furthermore, for example, functional blocks according to the present disclosure may be implemented with various programming or scripting languages. The functional blocks may be implemented using algorithms executed on one or more processors. Furthermore, the present disclosure may employ techniques of the related art for electronics configuration, signal processing, and/or data processing. The terms such as "mechanism", "element", "means", and "construction" may be used in a broad sense and are not limited to mechanical or physical components.

Throughout the specification, it will be understood that when a part is referred to as being "connected" or "coupled" to another part, it may be "directly connected" to or "electrically coupled" to the other part with one or more intervening elements therebetween. Furthermore, when a part "includes" or "comprises" an element, unless there is a particular description contrary thereto, the part may further include other elements, not excluding the other elements.

Furthermore, connecting lines or connectors shown in figures are intended to represent exemplary functional connections and/or physical or logical connections between components in the figures. In an actual device, connections between components may be represented by many alternative or additional functional connections, physical connections, or logical connections.

Furthermore, although the terms including an ordinal number such as "first", "second", etc. may be used herein to describe various elements or components, these elements or components should not be limited by the terms. The terms may only be used to distinguish one element or component from another element or component. For example, although first data and second data are described in the present specification, the terms are only used to differentiate the pieces of data from each other, and thus the pieces of data should not be limited by the terms.

Hereinafter, embodiments are described in detail with reference to the drawings.

FIG. 1 is a diagram illustrating an example of a method by which a plurality of electronic devices and a server perform federated learning. Although FIG. 1 illustrates a plurality of electronic devices, i.e., first electronic device 10a, second electronic device 10b, and third electronic device 10c, this is merely for convenience of description, and the present disclosure is not limited thereto. In addition, although FIG. 1 illustrates one server 20, this is merely for convenience of description, and the present disclosure is not limited thereto. According to an embodiment, a plurality of servers for providing cloud services may be collectively referred to as the server 20.

Referring to FIG. 1, the plurality of electronic devices, i.e., first electronic device 10a, second electronic device 10b, and third electronic device 10c, may include computing devices, such as mobile devices (e.g., a smartphone, a tablet personal computer (PC), etc.) capable of transmitting and receiving data to and from the server 20 over a network and general-purpose computers (PCs).

Furthermore, the plurality of electronic devices, i.e., first electronic device 10a, second electronic device 10b, and third electronic device 10c, may include Internet of Things (IoT) devices and home hub devices (e.g., a router, an interactive artificial intelligence (AI) speaker, etc.) connected to the IoT devices and the server 20.

According to an embodiment, the plurality of electronic devices, i.e., first electronic device 10a, second electronic device 10b, and third electronic device 10c, may include computing devices, such as mobile devices (e.g., a smartphone, a tablet PC, etc.) in which AI models 19a, 19b, and 19c are built, general-purpose computers (PCs), and a server.

According to an embodiment, the server 20 may transmit or receive data to or from at least one of the electronic devices 10a, 10b, and 10c. The server 20 may store the received data in a database. Also, the server 20 may perform various computations by using the received data. For example, the server 20 may refine a core AI model 29 built in the server 20 by using the received training data.

Functions related to AI according to embodiments of the disclosure may operate via a processor and a memory. The processor may be configured as one or a plurality of processors. In this case, the one or plurality of processors may be a general-purpose processor, such as a central processing unit (CPU), an application processor (AP), or a digital signal processor (DSP), a dedicated graphics processor, such as a graphics processing unit (GPU) or a vision processing unit (VPU), or a dedicated AI processor, such as a neural processing unit (NPU). The one or plurality of processors may control input data to be processed according to predefined operation rules or an AI model stored in the memory. Alternatively, when the one or more processors are a dedicated AI processor, the dedicated AI processor may be designed with a hardware structure specialized for processing a particular AI model.

The predefined operation rules or AI model may be created via a training process. The creation via the training process means that the predefined operation rules or AI model set to perform desired characteristics (or purpose) are created by training a basic AI model based on a large number of training data via a learning algorithm. The training process may be performed by an apparatus itself in which AI is performed or via a separate server and/or system. Examples of the learning algorithm may include, but are not limited to, supervised learning, unsupervised learning, semi-supervised learning, and reinforcement learning.

An AI model may include a plurality of neural network layers. Each of the plurality of neural network layers has a plurality of weight values and may perform neural network computations via calculations between a result of computations in a previous layer and a plurality of weight values. A plurality of weight values assigned to each of the plurality of neural network layers may be optimized based on a result of training the AI model. For example, a plurality of weight values may be modified to reduce or minimize a loss or cost value obtained in the AI model during a training process. An artificial neural network may include a deep neural network (DNN) and may be, for example, a convolutional neural network (CNN), a DNN, a recurrent neural network (RNN), a restricted Boltzmann machine (RBM), a deep belief network (DBN), a bidirectional recurrent DNN (BRDNN), or deep Q-networks (DQN), but is not limited thereto.

The disclosed AI model may be generated by learning a plurality of pieces of text data and a plurality of pieces of image data input as training data according to a predetermined criterion. The AI model may generate resulting data by performing a learned function corresponding to the input data, and output the resulting data.

In addition, the disclosed AI model may include a plurality of AI models trained to perform at least one function.

According to an embodiment, the plurality of electronic devices, i.e., first electronic device 10a, second electronic device 10b, and third electronic device 10c, may obtain training data and use the training data to respectively refine the AI models 19a, 19b, and 19c. In response to a request for transmission of data for refining the core AI model 29 from the server 20, each of the plurality of electronic devices, i.e., first electronic device 10a, second electronic device 10b, and third electronic device 10c, may transmit core AI update data to the server 20. Core AI update data refers to data transmitted to the server 20 from each of the plurality of electronic devices, i.e., first electronic device 10a, second electronic device 10b, and third electronic device 10c, so that the server 20 uses it to refine the core AI model 29.

For example, the plurality of electronic devices, i.e., first electronic device 10a, second electronic device 10b, and third electronic device 10c, may each transmit, to the server 20, training data used to refine the AI models 19a, 19b, and 19c as core AI update data.

As another example, the plurality of electronic devices, i.e., first electronic device 10a, second electronic device 10b, and third electronic device 10c, may each transmit, to the server 20, information about changes in the refined AI models 19a, 19b, and 19c (e.g., information about modified weight values of the AI models 19a, 19b, and 19c) as core AI update data.

According to an embodiment, the server 20 may refine the core AI model 29 built in the server 20 by using the received core AI update data.

For example, the server 20 may perform cloud machine learning for refining the core AI model 29 built in the server by using raw data or pre-processed training data received from the plurality of electronic devices, i.e., first electronic device 10a, second electronic device 10b, and third electronic device 10c.

In another example, the server 20 may perform federated learning for refining the core AI model 29 by using the pieces of core AI update data including pieces of information about changes in the refined AI models 19a, 19b, and 19c (e.g., information about modified weight values of the AI models 19a, 19b, and 19c), which are respectively received from the plurality of electronic devices, i.e., first electronic device 10a, second electronic device 10b, and third electronic device 10c.

According to an embodiment, the server 20 may identify whether it is connected with each of the plurality of electronic devices, i.e., first electronic device 10a, second electronic device 10b, and third electronic device 10c. The server 20 may identify a state of connection with each of the plurality of electronic devices, i.e., first electronic device 10a, second electronic device 10b, and third electronic device 10c, by transmitting and receiving data for periodically checking the state of connection therewith. In other words, the server 20 may identify an electronic device that is disconnected (dropped out) from the server 20.

According to an embodiment, the server 20 may request again a plurality of electronic devices except for the disconnected electronic device to transmit training data. The server 20 may request each of the plurality of electronic devices being connected thereto to transmit modified core AI update data based on information about the disconnected electronic device. Alternatively, the server 20 may request each of the plurality of electronic devices being connected thereto to transmit modified core AI update data based on information about the plurality of electronic devices being connected. The server 20 may refine the core AI model 29 by using the modified core AI update data.

According to an embodiment, the server 20 may transmit information about modified weight values of the core AI model 29 to the plurality of electronic devices, i.e., first electronic device 10a, second electronic device 10b, and third electronic device 10c. The plurality of electronic devices, i.e., first electronic device 10a, second electronic device 10b, and third electronic device 10c, may respectively refine the AI models 19a, 19b, and 19c thereof by using the information received from the server 20.

Figure 2:
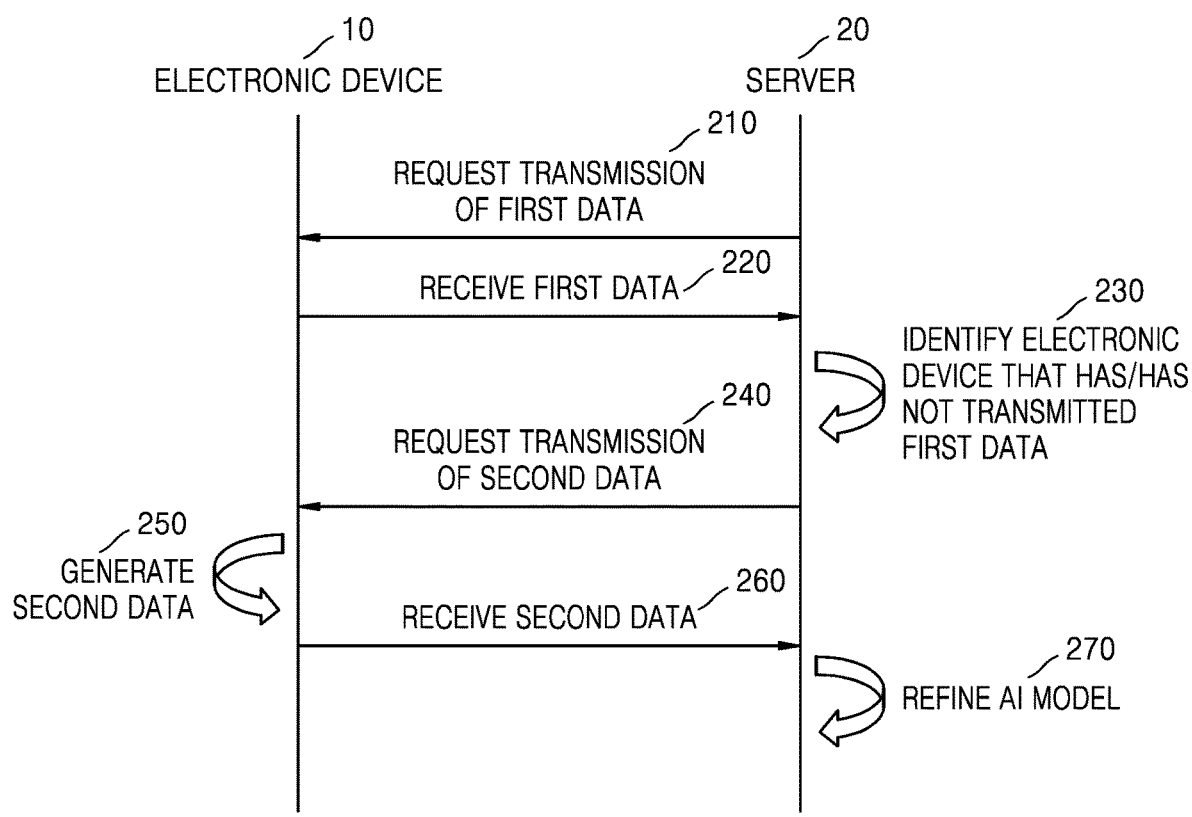
FIG. 2 is a flowchart of a method by which an electronic device and a server exchange data with each other, according to an embodiment.

FIG. 2 is a flowchart of a method by which an electronic device and a server exchange data with each other, according to an embodiment. First data and second data of FIG. 2 each refer to data including data used for refining a core AI model built in a server 20. In other words, the first data and the second data of FIG. 2 may each include the core AI update data described above with reference to FIG. 1. An electronic device 10 may generate the first data and the second data as vector-type data.

Referring to FIG. 2, the server 20 may have a core AI model 29 built therein. The server 20 may perform federated learning with an electronic device 10 in order to refine the core AI model 29.

The federated learning refers to machine learning in which the plurality of electronic devices, i.e., first electronic device 10a, second electronic device 10b, and third electronic device 10c, respectively refine the AI models 19a, 19b, and 19c built therein, and the server 20 refines the core AI model 29 by using information about changes in the refined AI models 19a, 19b, and 19c.

In each of the operations illustrated in FIG. 2, the server 20 may identify whether it is connected with each of the plurality of electronic devices, i.e., first electronic device 10a, second electronic device 10b, and third electronic device 10c. The server 20 may transmit and receive data for periodically checking a state of its connection with each of the plurality of electronic devices, i.e., first electronic device 10a, second electronic device 10b, and third electronic device 10c, based on identification information of each of the plurality of electronic devices, i.e., first electronic device 10a, second electronic device 10b, and third electronic device 10c, received from a corresponding first electronic device 10a, second electronic device 10b, or third electronic device 10c.

Referring to operation 210, the server 20 may request the electronic device 10 to transmit the first data including the core AI update data.

According to an embodiment, the server 20 may receive, from each of the plurality of electronic devices, i.e., first electronic device 10a, second electronic device 10b, and third electronic device 10c, identification information including a weight value for each of the plurality of electronic devices, i.e., first electronic device 10a, second electronic device 10b, and third electronic device 10c.

A weight value for the electronic device 10 indicates the importance of private data generated by the electronic device 10 and used to refine the core AI model 29. The weight value for the electronic device 10 may include information related to the number of times that an AI model built in the electronic device 10 is trained.

According to an embodiment, the core AI update data may include training data used to refine the AI models 19a, 19b, and 19c respectively built in the plurality of electronic devices, i.e., first electronic device 10a, second electronic device 10b, and third electronic device 10c.

According to an embodiment, the core AI update data may include information about changes in the refined AI models 19a, 19b, and 19c. The information about the changes in the AI models 19a, 19b, and 19c may include information about modified weight values among weight values of neural network layers in the AI models 19a, 19b, and 19c.

According to an embodiment, the server 20 may request each of the plurality of electronic devices, i.e., first electronic device 10a, second electronic device 10b, and third electronic device 10c, to transmit, as private data, vector-type data including information about a modified weight value of each of the AI models 19a, 19b, and 19c. Private data means information about a modified weight value among weight values of the neural network layers in each of the AI models 19a, 19b, and 19c.

According to an embodiment, data transmitted by the server 20 to the electronic device 10 may include information about a noise level set by the server 20. The server 20 may set a noise level based on pieces of identification information respectively received from the plurality of electronic devices, i.e., first electronic device 10a, second electronic device 10b, and third electronic device 10c.

The noise level is information for indicating a sum of pieces of differential privacy protection data respectively received from the plurality of electronic devices, i.e., first electronic device 10a, second electronic device 10b, and third electronic device 10c. According to an embodiment, the server 20 may set, as a noise level, a constant number used to determine a variance of Gaussian noise.

Differential privacy protection data refers to data for protecting private data by using a differential privacy technique so that private data generated by an electronic device is not specified. According to an embodiment, the differential privacy protection data may be vector-type data including Gaussian noise.

Referring to operation 220, the server 20 may receive the first data from the electronic device 10.

According to an embodiment, the electronic device 10 may transmit, to the server 20, the first data obtained by adding differential privacy protection data to private data so that the private data is not specified. The differential privacy protection data may be generated based on the information about the noise level received by the electronic device 10 from the server 20 in operation 210.

According to an embodiment, the first electronic device 10a may generate first differential privacy protection data thereof, based on a sum of the weight values for the plurality of electronic devices, i.e., first electronic device 10a, second electronic device 10b, and third electronic device 10c, a weight value for the first electronic device 10a, and the noise level set by the server 20. The first electronic device 10a may generate the first differential privacy protection data as vector-type data.

The server 20 may refine, based on the noise level, the core AI model 29 by using the sum of pieces of private data to which corresponding differential privacy protection data is added and which are received from the plurality of electronic devices, i.e., first electronic device 10*a*, second electronic device 10*b*, and third electronic device 10*c*.

According to an embodiment, the electronic device 10 may transmit, to the server 20, the first data including private data to which masking data is added so that the private data is not specified.

The masking data is data for protecting the private data in the electronic device 10 so that the private data is not specified, and refers to data generated by the electronic device 10 according to a certain rule.

For example, the first electronic device 10*a* may randomly generate the masking data. As another example, the second electronic device 10*b* among the plurality of electronic devices, i.e., first electronic device 10*a*, second electronic device 10*b*, and third electronic device 10*c*, may generate masking data, based on a public key of the first electronic device 10*a*, a public key of the third electronic device 10*c*, and a secure key of the second electronic device 10*b*.

A public key refers to data indicating that the electronic device 10 performing federated learning corresponds to a device performing the federated learning with external devices (e.g., another electronic device and a server). The public key may include identification information of each of a plurality of electronic devices that perform federated learning.

A secure key refers to data that the electronic device 10 generates to be used for generating masking data according to a certain rule. The secure key may be generated together with the public key.

According to an embodiment, the electronic device 10 may transmit, to the server 20, the first data including all of the differential privacy protection data, the masking data, and the private data.

Referring to operation 230, the server 20 may identify an electronic device that has not transmitted the first data from among the plurality of electronic devices, i.e., first electronic device 10*a*, second electronic device 10*b*, and third electronic device 10*c*. Alternatively, the server 20 may identify an electronic device that has transmitted the first data from among the plurality of electronic devices, i.e., first electronic device 10*a*, second electronic device 10*b*, and third electronic device 10*c*.

According to an embodiment, the server 20 may generate a list of a plurality of electronic devices that perform federated learning with the server 20. The server 20 may generate the list based on public keys received from the plurality of electronic devices, i.e., first electronic device 10*a*, second electronic device 10*b*, and third electronic device 10*c*. The server 20 may identify an electronic device dropped out of the server 20 among the plurality of electronic devices, i.e., first electronic device 10*a*, second electronic device 10*b*, and third electronic device 10*c*, included in the list. The server 20 may identify the electronic device that has not transmitted the first data by identifying the electronic device dropped out of the server 20.

According to an embodiment, the server 20 may identify an electronic device that has transmitted the first data and an electronic device that has not transmitted the first data for a predetermined time period after the time when operation 210 is completed. The server 20 may transmit data for checking a connection state to the electronic device that has not transmitted the first data. In this case, the server 20 may request again transmission of the first data. The server 20 may identify an electronic device that has not transmitted the first data as an electronic device dropped out of the server 20.

Referring to operation 240, the server 20 may request the electronic device 10 to transmit the second data.

According to an embodiment, the server 20 may transmit data for requesting transmission of the second data to at least one electronic device that has transmitted the first data. In this case, the server 20 may transmit, to a plurality of electronic devices that have transmitted the first data, information (e.g., identification information) related to the electronic device that has transmitted the first data or information (e.g., identification information) related to the electronic device that has not transmitted the first data. For example, the server 20 may transmit a list of electronic devices that have not transmitted the first data or a list of electronic devices that have transmitted the first data to the plurality of electronic devices that have transmitted the first data. The server 20 may transmit a list generated based on public keys received from the plurality of electronic devices.

According to an embodiment, the server 20 may change the noise level and transmit information related to the changed noise level to the plurality of electronic devices that have transmitted the first data.

Referring to operation 250, the electronic device 10 that has transmitted the first data to the server 20 may generate the second data in response to the request from the server 20.

According to an embodiment, the electronic device 10 may generate the second data including differential privacy modification data used to modify the first differential privacy protection data into second differential privacy protection data. For example, the first electronic device 10*a* may generate differential privacy modification data used to modify the first differential privacy protection data into the second differential privacy protection data, based on a sum of weight values of the plurality of electronic devices that have transmitted the first data to the server 20 and a weight value for the first electronic device 10*a*. The first electronic device 10*a* may generate the differential privacy modification data as vector-type data.

According to an embodiment, the electronic device 10 may generate the second data including differential privacy modification data that is a difference value between the first differential privacy protection data and the second differential privacy protection data.

According to an embodiment, the electronic device 10 may generate the second differential privacy protection data based on a noise level newly set by the server 20 in operation 240. For example, the first electronic device 10*a* may generate the second differential privacy protection information, based on the sum of the weight values for the plurality of electronic devices, i.e., first electronic device 10*a*, second electronic device 10*b*, and third electronic device 10*c*, that have transmitted the first data to the server 20, the weight value for the first electronic device 10*a*, and the newly set noise level. The first electronic device 10*a* may generate the second differential privacy protection data as vector-type data.

Referring to operation 260, the server 20 may receive the second data from the electronic device 10.

According to an embodiment, the electronic device 10 may transmit, to the server 20, the second data including the differential privacy modification data that is a difference value between the second differential privacy protection data and the first differential privacy protection data.

According to an embodiment, when the first differential privacy protection data and the second differential privacy protection data are generated based on the same noise level, a sum of pieces of second differential privacy protection data (e.g., a distribution of a sum of Gaussian noise) to be respectively received from the plurality of electronic devices, i.e., first electronic device 10a, second electronic device 10b, and third electronic device 10c, in operation 260 may be equal to a sum of pieces of first differential privacy protection data (e.g., a distribution of a sum of Gaussian noise) to be respectively received by the server 20 from the plurality of electronic devices, i.e., first electronic device 10a, second electronic device 10b, and third electronic device 10c, in operation 220.

According to an embodiment, the second differential privacy protection data may be generated based on the changed noise level in operation 240. In this case, the sum of the pieces of second differential privacy protection data to be respectively received by the server 20 from the plurality of electronic devices, i.e., first electronic device 10a, second electronic device 10b, and third electronic device 10c, in operation 260 may not be equal to the sum of the pieces of first differential privacy protection data to be respectively received by the server 20 from the plurality of electronic devices, i.e., first electronic device 10a, second electronic device 10b, and third electronic device 10c, in operation 220. The electronic device 10 may transmit, to the server 20, the second data including private data to which the second differential privacy protection data is added.

Referring to operation 270, the server 20 may refine the core AI model 29 by using the received first data and second data.

According to an embodiment, the server 20 may refine the core AI model 29 by using a sum of pieces of private data to which pieces of differential privacy protection data received from the plurality of electronic devices, i.e., first electronic device 10a, second electronic device 10b, and third electronic device 10c, are respectively added.

According to an embodiment, the server 20 may obtain the sum of pieces of private data on the plurality of electronic devices, i.e., first electronic device 10a, second electronic device 10b, and third electronic device 10c, to which the pieces of differential privacy protection data are respectively added, by removing a sum of pieces of masking data using pieces of the second data respectively received from the plurality of electronic devices, i.e., first electronic device 10a, second electronic device 10b, and third electronic device 10c.

According to the embodiment illustrated in FIG. 2, even when some of the plurality of electronic devices, i.e., first electronic device 10a, second electronic device 10b, and third electronic device 10c, are dropped out while transmitting data to the server 20, the server 20 may refine the core AI model 29. In addition, personal information is not leaked from data transmitted from the electronic device 10.

Figure 3:
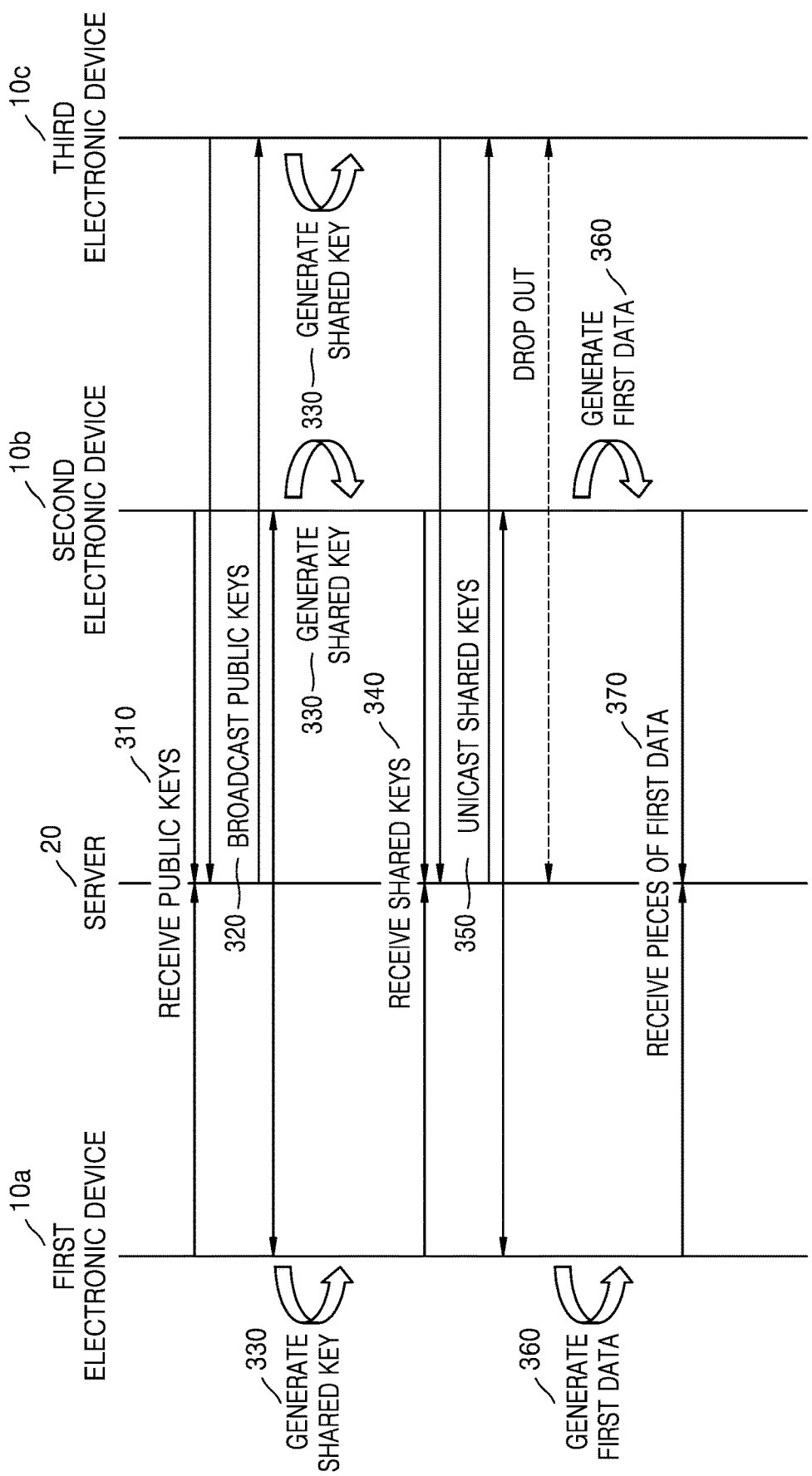
FIG. 3 is a flowchart of a method by which a plurality of electronic devices and a server exchange data with one another, according to an embodiment.

FIG. 3 is a flowchart of a method by which the plurality of electronic devices, i.e., first electronic device 10a, second electronic device 10b, and third electronic device 10c, and the server 20 exchange data with one another, according to an embodiment. Operations 310 to 350 embody operation 210 of FIG. 2, and operations 360 and 370 embody operation 220 of FIG. 2. First data of FIG. 3 may include the core AI update data described above with reference to FIG. 1.

Referring to FIG. 3, the server 20 may create a network for federated learning with the plurality of electronic devices, i.e., first electronic device 10a, second electronic device 10b, and third electronic device 10c. In each of the operations illustrated in FIG. 3, the server 20 may identify whether it is connected with each of the plurality of electronic devices, i.e., first electronic device 10a, second electronic device 10b, and third electronic device 10c.

Referring to operation 310, each of the plurality of electronic devices, i.e., first electronic device 10a, second electronic device 10b, and third electronic device 10c, may transmit a public key to the server 20.

According to an embodiment, a public key of each of the plurality of electronic devices, i.e., first electronic device 10a, second electronic device 10b, and third electronic device 10c, may include identification information and a weight value of each of the plurality of electronic devices, i.e., first electronic device 10a, second electronic device 10b, and third electronic device 10c.

Referring to operation 320, the server 20 may broadcast the received public keys to each of the plurality of electronic devices, i.e., first electronic device 10a, second electronic device 10b, and third electronic device 10c.

According to an embodiment, the server 20 may generate broadcast data by using the received public keys.

According to an embodiment, the server 20 may generate a list of the plurality of electronic devices, i.e., first electronic device 10a, second electronic device 10b, and third electronic device 10c, that perform federated learning with the server 20, based on the public keys respectively received from the plurality of electronic devices, i.e., first electronic device 10a, second electronic device 10b, and third electronic device 10c. The server 20 may transmit broadcast data including the public keys to each of the plurality of electronic devices, i.e., first electronic device 10a, second electronic device 10b, and third electronic device 10c, included in the list.

According to an embodiment, the broadcast data may include information about weight values for the plurality of electronic devices, i.e., first electronic device 10a, second electronic device 10b, and third electronic device 10c, that perform the federated learning with the server 20.

According to an embodiment, the broadcast data may include information about a sum of the weight values for the plurality of electronic devices, i.e., first electronic device 10a, second electronic device 10b, and third electronic device 10c, that perform the federated learning with the server 20.

According to an embodiment, the broadcast data may include information about a noise level set by the server 20.

Referring to operation 330, each of the plurality of electronic devices, i.e., first electronic device 10a, second electronic device 10b, and third electronic device 10c, may generate a shared key. A shared key refers to data that a plurality of electronic devices, i.e., first electronic device 10a, second electronic device 10b, and third electronic device 10c, performing the federated learning share with each other. For example, the first electronic device 10a may generate a first shared key to be transmitted to the second electronic device 10b and a second shared key to be transmitted to the third electronic device 10c.

According to an embodiment, a shared key may include partial data of a secure key of the electronic device 10 and partial data of masking data of the electronic device 10.

According to an embodiment, a shared key may include identification information of an electronic device to which the shared key is to be unicast. For example, the first shared key may include identification information of the second electronic device 10b. The second shared key may include identification information of the third electronic device 10c.

Referring to operation 340, each of the plurality of electronic devices, i.e., first electronic device 10a, second electronic device 10b, and third electronic device 10c, may transmit the shared key to the server 20.

Referring to operation 350, the server 20 may unicast the received shared keys based on identification information included in each of the shared keys.

According to an embodiment, the data unicast by the server 20 may include data for requesting transmission of data used to refine the core AI model 29. In other words, when the server 20 unicasts the received shared keys to each of the plurality of electronic devices, i.e., first electronic device 10a, second electronic device 10b, and third electronic device 10c, the server 20 may transmit, to each of the plurality electronic devices 10a, 10b, and 10c, data for requesting transmission of vector-type data including information about modified weight values of the AI models 19a, 19b, and 19c.

Referring to operation 360, each of the plurality of electronic devices, i.e., first electronic device 10a, second electronic device 10b, and third electronic device 10c, may generate first data used to refine the core AI model 29 based on the unicast shared keys.

According to an embodiment, each of the plurality of electronic devices, i.e., first electronic device 10a, second electronic device 10b, and third electronic device 10c, may generate vector-type data including private data as the first data. For example, the first electronic device 10a may generate vector-type data including information about a modified weight value of the AI model 19a built in the first electronic device 10a as private data.

According to an embodiment, the first data generated by each of the plurality of electronic devices, i.e., first electronic device 10a, second electronic device 10b, and third electronic device 10c, may include differential privacy protection data for preventing private data from being specified. For example, the first electronic device 10a may generate the first differential privacy protection data based on information about the noise level set by the server 20. The first electronic device 10a may generate the first data including the first differential privacy protection data.

According to an embodiment, the first data generated by each of the plurality of electronic devices, i.e., first electronic device 10a, second electronic device 10b, and third electronic device 10c, may include masking data for preventing private data from being specified. For example, the first electronic device 10a may generate the first data including masking data generated according to a certain rule. As another example, the first electronic device 10a may generate masking data, based on a secure key of the first electronic device 10a, a public key of the second electronic device 10b, and a public key of the third electronic device 10c.

Referring to operation 370, each of the plurality of electronic devices, i.e., first electronic device 10a, second electronic device 10b, and third electronic device 10c, may transmit the first data to the server 20.

According to an embodiment, each of the plurality of electronic devices, i.e., first electronic device 10a, second electronic device 10b, and third electronic device 10c, may transmit the first data generated in operation 360 to the server 20. The server 20 may refine the core AI model 29 by using the sum of pieces of private data of the plurality of electronic devices, i.e., first electronic device 10a, second electronic device 10b, and third electronic device 10c, the pieces of private data being respectively included in the received pieces of first data. Because the server 20 refines the core AI model 29 by using the sum of pieces of private data to which differential privacy protection data is added, private data of each of the plurality of electronic devices, i.e., first electronic device 10a, second electronic device 10b, and third electronic device 10c, is not specified.

Moreover, referring to FIG. 3, some of the plurality of electronic devices, i.e., first electronic device 10a, second electronic device 10b, and third electronic device 10c, connected to the server 20 may be dropped out of the server 20.

For example, after exchanging shared keys with the first electronic device 10a and the second electronic device 10b through the server 20, the third electronic device 10c may be dropped out of the server 20 before transmission of the first data to the server 20. The third electronic device 10c dropped out of the server 20 is not able to transmit the first data to the server 20.

The server 20 may obtain the sum of pieces of private data from data obtained by summing the pieces of first data obtained from all of the plurality of electronic devices, i.e., first electronic device 10a, second electronic device 10b, and third electronic device 10c, connected to the server 20. Because the server 20 fails to obtain the first data from the disconnected third electronic device 10c, the data obtained by summing the pieces of first data does not include differential privacy protection data corresponding to the noise level set by the server 20. Furthermore, the server 20 cannot remove masking data from the sum of the pieces of first data. A problem occurs in that the server 20 cannot refine the core AI model 29.

Figure 4:
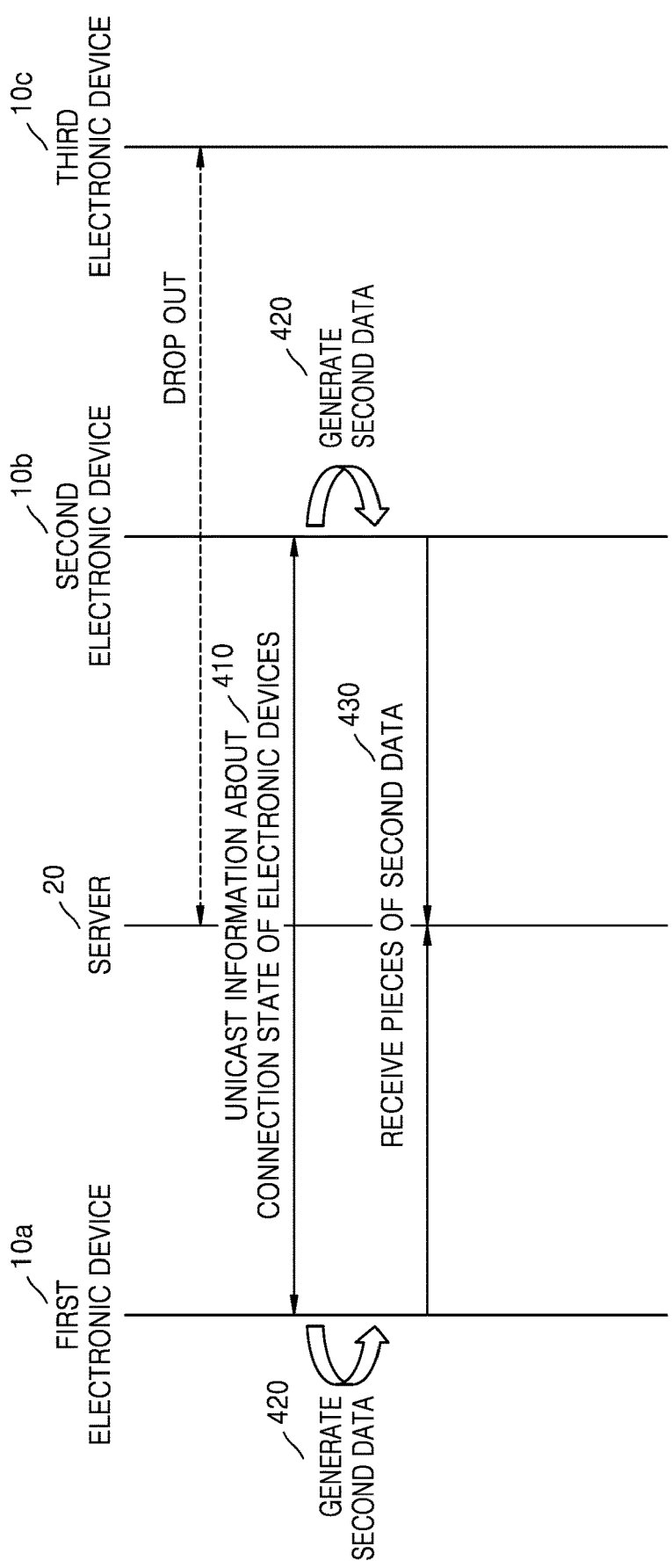
FIG. 4 is a flowchart of a method by which a plurality of electronic devices and a server exchange data with one another, according to an embodiment.

FIG. 4 is a flowchart of a method by which a plurality of electronic devices and a server exchange data with one another, according to an embodiment. Operation 410 embodies operation 240 of FIG. 2, operation 420 embodies operation 250 of FIG. 2, and operation 430 embodies operation 260 of FIG. 2. Second data of FIG. 4 may include the core AI update data described above with reference to FIG. 1.

Referring to operation 410, the server 20 may unicast information about a connection state of the plurality of electronic devices, i.e., first electronic device 10a, second electronic device 10b, and third electronic device 10c, to each of the first electronic device 10a and the second electronic device 10b connected to the server 20.

According to an embodiment, the server 20 may unicast, to each of the first electronic device 10a and the second electronic device 10b that have transmitted the first data, information related to the first electronic device 10a and first second device 10b that have transmitted the first data, among the plurality of electronic devices, i.e., first electronic device 10a, second electronic device 10b, and third electronic device 10c, performing the federated learning with the server 20, or information related to the third electronic device 10c that has not transmitted the first data. For example, the server 20 may unicast information including identification information and a weight value of the second electronic device 10b to the first electronic device 10a. In another example, the server 20 may unicast information including identification information and a weight value of the third electronic device 10c to each of the first electronic device 10a and the second electronic device 10b.

According to an embodiment, the server 20 may unicast a list of the plurality of electronic devices, i.e., first electronic device 10a, second electronic device 10b, and third electronic device 10c, that perform the federated learning with the server 20 to the first electronic device 10a and the second electronic device 10b that have transmitted the first data to the server 20. The list may include identification information and weight values of the first electronic device 10a and the second electronic device 10b that have transmitted the first data to the server 20. Also, the list may include identification information and a weight value of the third electronic device 10c that has not transmitted the first data to the server 20.

According to an embodiment, data unicast by the server 20 may include data for requesting transmission of the second data. For example, the server 20 may unicast, to the first electronic device 10a and the second electronic device 10b that have transmitted the first data, data for requesting transmission of the second data including differential privacy modification data used to modify first differential privacy protection data into second differential privacy protection data.

According to an embodiment, the server 20 may newly set a noise level and unicast information about the set noise level to the first electronic device 10a and the second electronic device 10b that have transmitted the first data. For example, the server 20 may newly set a noise level based on the pieces of identification information of the first electronic device 10a and the second electronic device 10b that have transmitted the first data to the server 20.

Referring to operation 420, the first electronic device 10a and the second electronic device 10b may generate the second data.

According to an embodiment, the first electronic device 10a and the second electronic device 10b may each modify the first differential privacy protection data into the second differential privacy protection data. For example, the first electronic device 10a may modify the first differential privacy protection information into the second differential privacy protection information, based on a sum of the weight values for the first electronic device 10a and the second electronic device 10b that have transmitted the first data to the server 20 and the weight value for the first electronic device 10a. A sum of pieces of second differential privacy protection data (e.g., a distribution of a sum of Gaussian noise) for the first electronic device 10a and the second electronic device 10b may be equal to a sum of pieces of first differential privacy protection data (e.g., a distribution of a sum of Gaussian noise) to be respectively received by the server 20 from the plurality of electronic devices, i.e., first electronic device 10a, second electronic device 10b, and third electronic device 10c.

According to an embodiment, the second data generated by each of the plurality of electronic devices, i.e., first electronic device 10a, second electronic device 10b, and third electronic device 10c, may include shared secure data used to remove masking data. The shared secure data means partial data of masking data and partial data of a secure key shared by the plurality of electronic devices, i.e., first electronic device 10a, second electronic device 10b, and third electronic device 10c, with each other in order to remove masking data generated by each of the plurality of electronic devices, i.e., first electronic device 10a, second electronic device 10b, and third electronic device 10c. For example, the first electronic device 10a may generate shared secure data including partial data of a secure key of the second electronic device 10b and partial data of a secure key of the third electronic device 10c. Also, the first electronic device 10a may generate shared secure data including partial data of masking data of the second electronic device 10b and partial data of the masking data of the third electronic device 10c.

According to an embodiment, each of the first electronic device 10a and the second electronic device 10b may generate the second data including differential privacy modification data that is a difference value between the second differential privacy protection data and the first differential privacy protection data.

According to an embodiment, each of the first electronic device 10a and the second electronic device 10b may generate the second differential privacy protection data based on the noise level newly set by the server 20. Each of the first electronic device 10a and the second electronic device 10b may generate the second data including private data to which the second differential privacy protection data is added. Because this operation is similar to operation 360 of FIG. 3, descriptions already provided above are omitted.

Referring to operation 430, the first electronic device 10a and the second electronic device 10b may each transmit the second data to the server 20.

According to an embodiment, each of the first electronic device 10a and the second electronic device 10b may transmit, to the server 20, the second data including the differential privacy modification data that is a difference value between the second differential privacy protection data and the first differential privacy protection data.

According to an embodiment, each of the first electronic device 10a and the second electronic device 10b may transmit, to the server 20, the second data including private data to which the second differential privacy protection data is added.

According to an embodiment, the server 20 may obtain a sum of pieces of private data of the plurality of electronic devices, i.e., first electronic device 10a, second electronic device 10b, and third electronic device 10c, to which pieces of differential privacy protection data are respectively added, by using pieces of the first data received in operation 370 and pieces of the second data received from the first electronic device 10a and the second electronic device 10b.

According to an embodiment, the server 20 may add, to the sum of the pieces of first data, pieces of differential privacy modification data in the pieces of second data, which is a difference value between the second differential privacy protection data and the first differential privacy protection data. The server 20 may refine the core AI model 29 by using the sum of the pieces of first data to which the pieces of differential privacy modification data are added.

According to an embodiment, the server 20 may remove, from the sum of the pieces of first data, a sum of pieces of masking data respectively included in the pieces of the first data. For example, the server 20 may restore the pieces of masking data of the plurality of electronic devices, i.e., first electronic device 10a, second electronic device 10b, and third electronic device 10c, and a secure key of the disconnected electronic device 10c from pieces of shared secure data generated by the plurality of electronic devices, i.e., first electronic device 10a, second electronic device 10b, and third electronic device 10c, and included in the pieces of first data. The server 20 may subtract the pieces of masking data from the sum of the pieces of first data by using the restored secure key.

According to the embodiments illustrated in FIGS. 3 and 4, personal information may not be leaked even when an electronic device is disconnected while the plurality of electronic devices, i.e., first electronic device 10a, second electronic device 10b, and third electronic device 10c, transmit data to the server, and vector-type data for refining the core AI model 29 may be obtained.

Figure 5:
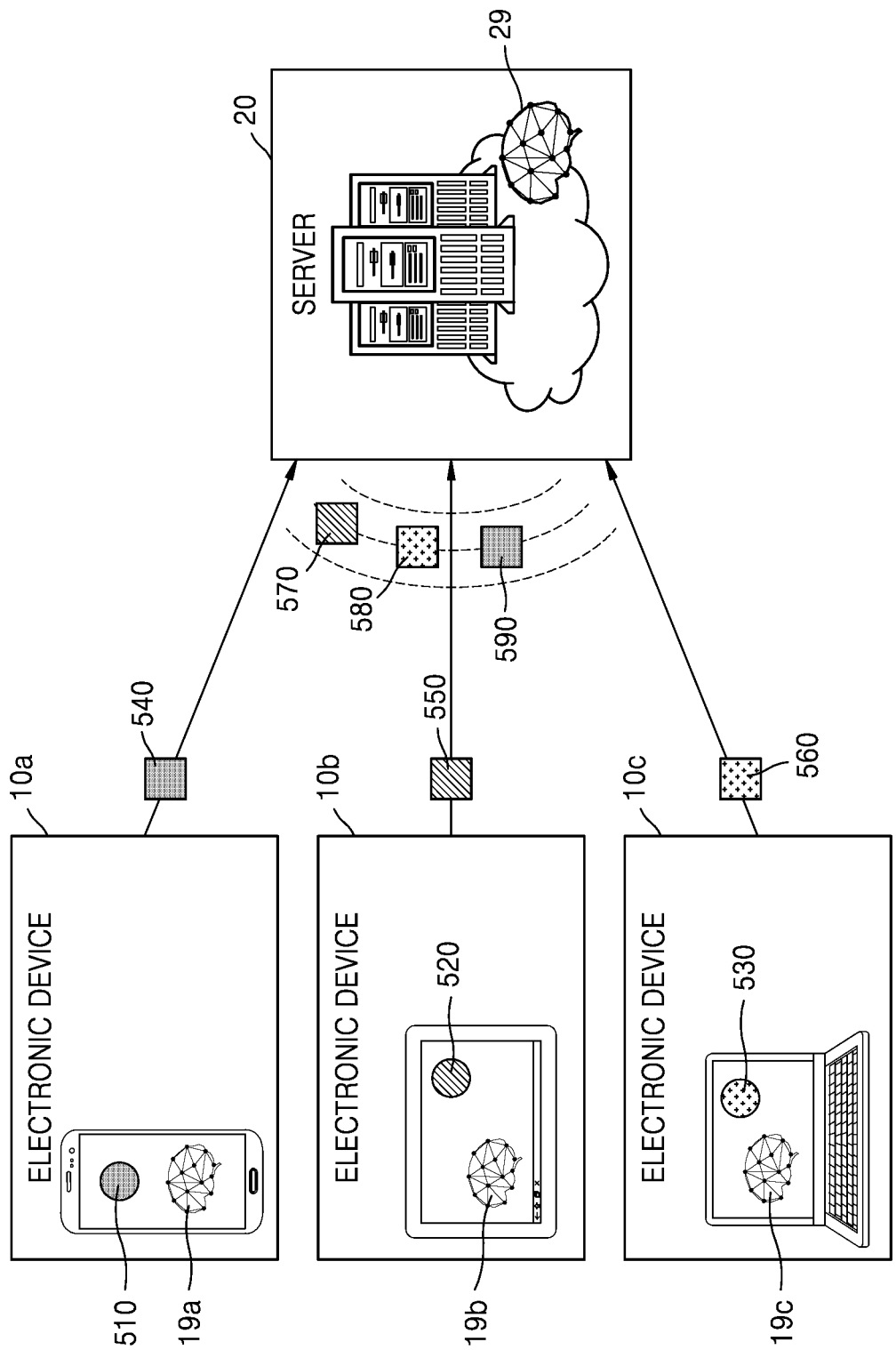
FIG. 5 is a diagram illustrating that a server broadcasts public keys of a plurality of electronic devices, according to an embodiment.

FIG. 5 is a diagram illustrating that a server broadcasts public keys of a plurality of electronic devices, according to an embodiment. FIG. 5 is a schematic diagram of operations 310 and 320 of FIG. 3.

Referring to FIG. 5, the plurality of electronic devices, i.e., first electronic device 10a, second electronic device 10b, and third electronic device 10c, performing federated learning with the server 20 may respectively have the AI models 19a, 19b, and 19c built therein. The plurality of electronic devices, i.e., first electronic device 10a, second electronic device 10b, and third electronic device 10c, respectively may generate pieces of private data 510, 520, and 530 representing modified weight values among weight values of the neural network layers in the AI models 19a, 19b, and 19c. The plurality of electronic devices, i.e., first electronic device 10a, second electronic device 10b, and third electronic device 10c, need to create a network with the server 20 in order to respectively transmit the pieces of private data 510, 520, and 530 to the server.

Referring to FIG. 5, the plurality of electronic devices, i.e., first electronic device 10a, second electronic device 10b, and third electronic device 10c, respectively generate public keys, i.e., first public key 540, second public key 550, and third public key 560, and transmit the generated public keys, i.e., first public key 540, second public key 550, and third public key 560, to the server 20 in order to create a network with the server 20.

According to an embodiment, the plurality of electronic devices, i.e., first electronic device 10a, second electronic device 10b, and third electronic device 10c, respectively generate the public keys, i.e., first public key 540, second public key 550, and third public key 560, each of the public keys, i.e., first public key 540, second public key 550, and third public key 560, including identification information and a weight value of each of the plurality of electronic devices, i.e., first electronic device 10a, second electronic device 10b, and third electronic device 10c.

For example, the first electronic device 10a may generate the first public key 540 including identification information and a weight value of the first electronic device 10a. The second electronic device 10b may generate the second public key 550 including identification information and a weight value of the second electronic device 10b. The third electronic device 10c may generate the third public key 560 including identification information and a weight value of the third electronic device 10c.

According to an embodiment, the plurality of electronic devices, i.e., first electronic device 10a, second electronic device 10b, and third electronic device 10c, may respectively transmit the public keys, i.e., first public key 540, second public key 550, and third public key 560, to the server 20.

Referring to FIG. 5, the server 20 may broadcast the received public keys, i.e., first public key 540, second public key 550, and third public key 560, to each of the plurality of electronic devices, i.e., first electronic device 10a, second electronic device 10b, and third electronic device 10c.

According to an embodiment, the server 20 may generate pieces of broadcast data by using the received public keys, i.e., first public key 540, second public key 550, and third public key 560. For example, the server 20 may generate first broadcast data 570 including the identification information and the weight value of the first electronic device 10a by using the first public key 540 of the first electronic device 10a. The server 20 may generate second broadcast data 580 including the identification information and the weight value of the second electronic device 10b by using the second public key 550 of the second electronic device 10b. The server 20 may generate third broadcast data 590 including the identification information and the weight value of the third electronic device 10c by using the third public key 560 of the third electronic device 10c.

According to an embodiment, the server 20 may generate the pieces of broadcast data, i.e., first broadcast data 570, second broadcast data 580, and third broadcast data 590, each including information about a sum of weight values of the plurality of electronic devices, i.e., first electronic device 10a, second electronic device 10b, and third electronic device 10c, that perform federated learning with the server 20. For example, the server 20 may obtain the sum of the weight value of the first electronic device 10a acquired from the first public key 540 thereof, the weight value of the second electronic device 10b acquired from the second public key 550 thereof, and the weight value of the third electronic device 10c acquired from the third public key 560 thereof. The server 20 may generate the first broadcast data 570, the second broadcast data 580, and the third broadcast data 590, each including information about the sum of the obtained weight values.

According to an embodiment, the server 20 may generate the pieces of broadcast data, i.e., first broadcast data 570, second broadcast data 580, and third broadcast data 590, each including information about a noise level set by the server 20. The noise level is information indicating a sum of pieces of differential privacy protection data respectively received from the plurality of electronic devices, i.e., first electronic device 10a, second electronic device 10b, and third electronic device 10c.

According to an embodiment, the server 20 may set, as a noise level, a constant number used to determine a variance of the Gaussian noise that is differential privacy protection data.

$$e \sim N(O, \sigma^2 I) \qquad \text{[Equation 1]}$$

e denotes the Gaussian noise, and σ denotes a standard deviation. The variance is the square of the standard deviation σ.

The standard deviation σ may be defined by Equation 2 below.

$$\sigma = \frac{c}{n} \cdot Z \qquad \text{[Equation 2]}$$

c denotes a maximum value of a vector, n denotes the sum of weight values of electronic devices, and Z denotes a noise constant.

According to an embodiment, the server 20 may set a value of the noise constant Z as the noise level. The server 20 may set a value of the standard deviation σ as the noise level.

According to an embodiment, the server 20 may set the noise level based on pieces of identification information respectively received from the plurality of electronic devices, i.e., first electronic device 10a, second electronic device 10b, and third electronic device 10c. For example, the server 20 may determine the value of the standard deviation σ and/or the noise constant Z, based on the number of the plurality of electronic devices, i.e., first electronic device 10a, second electronic device 10b, and third electronic device 10c, connected to the server 20, which is obtained based on the pieces of identification information. In another example, the server 20 may determine the value of the standard deviation σ and/or the noise constant Z of Gaussian noise, based on the sum of the weight values of the plurality of electronic devices, i.e., first electronic device 10a, second electronic device 10b, and third electronic device 10c. In another example, the server 20 may determine the value of the standard deviation σ and/or the noise constant Z, based on a value obtained by dividing the sum of the weight values by the number of the plurality of electronic devices, i.e., first electronic device 10a, second electronic device 10b, and third electronic device 10c, connected to the server 20.

Because the server 20 sets the noise level based on the pieces of identification information received from the plurality of electronic devices, i.e., first electronic device 10a, second electronic device 10b, and third electronic device 10c, security for private data from the plurality of electronic devices, i.e., first electronic device 10a, second electronic device 10b, and third electronic device 10c, may be enhanced.

According to an embodiment, the server 20 may generate a list of the plurality of electronic devices, i.e., first electronic device 10a, second electronic device 10b, and third electronic device 10c, that perform federated learning with the server 20, based on the public keys respectively received from the plurality of electronic devices, i.e., first electronic device 10a, second electronic device 10b, and third electronic device 10c. The server 20 may transmit the pieces of broadcast data, i.e., first broadcast data 570, second broadcast data 580, and third broadcast data 590, respectively to the plurality of electronic devices, i.e., first electronic device 10a, second electronic device 10b, and third electronic device 10c, included in the list. Also, the server 20 may transmit the pieces of broadcast data, i.e., first broadcast data 570, second broadcast data 580, and third broadcast data 590, each including the list, to the plurality of electronic devices, i.e., first electronic device 10a, second electronic device 10b, and third electronic device 10c, respectively.

Figure 6:
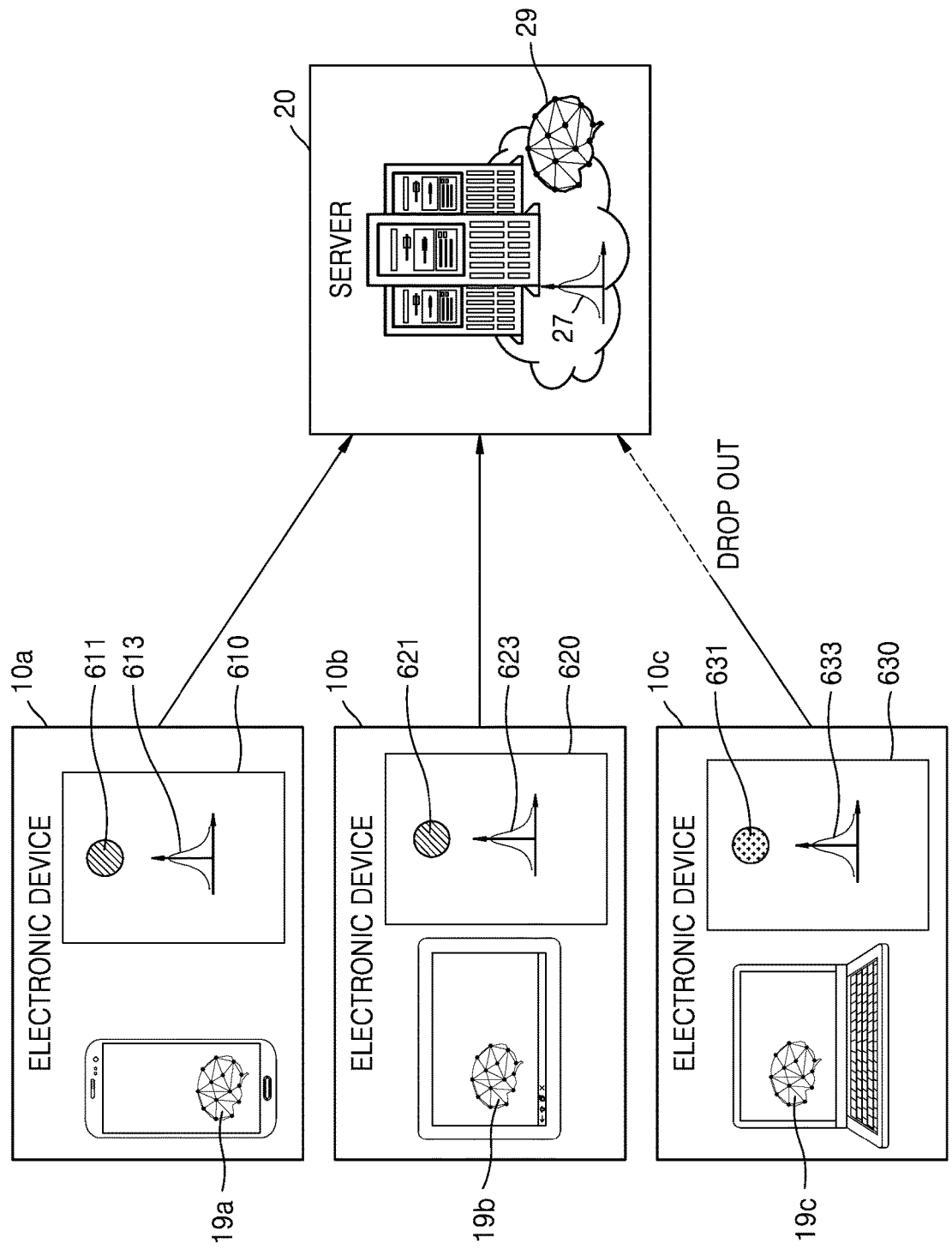
FIG. 6 is a diagram illustrating that a plurality of electronic devices transmit differential privacy protection data to a server, according to an embodiment.

FIG. 6 is a diagram illustrating that a plurality of electronic devices transmit differential privacy protection data to a server, according to an embodiment.

Referring to FIG. 6, the plurality of electronic devices, i.e., first electronic device 10a, second electronic device 10b, and third electronic device 10c, that perform federated learning with the server 20 may respectively transmit pieces of core AI update data 610, 620, and 630 to the server 20.

According to an embodiment, the plurality of electronic devices, i.e., first electronic device 10a, second electronic device 10b, and third electronic device 10c, may respectively generate the pieces of core AI update data 610, 620, and 630 respectively including pieces of private data 611, 621, and 631, which represent information about modified weight values among weight values of neural network layers in the AI models 19a, 19b, and 19c, and pieces of differential privacy protection data 613, 623, and 633 for respectively protecting the pieces of private data 611, 621, and 631.

According to an embodiment, the plurality of electronic devices, i.e., first electronic device 10a, second electronic device 10b, and third electronic device 10c, may respectively generate the pieces of differential privacy protection data 613, 623, and 633 for respectively protecting the pieces of private data 611, 621, and 631. For example, the plurality of electronic devices, i.e., first electronic device 10a, second electronic device 10b, and third electronic device 10c, may respectively generate, as the pieces of differential privacy protection data 613, 623, and 633, certain noise added to the pieces of private data 611, 621, and 631 for perturbation.

According to an embodiment, the plurality of electronic devices, i.e., first electronic device 10a, second electronic device 10b, and third electronic device 10c, may generate noise having a specific distribution within a confidence interval as the pieces of differential privacy protection data 613, 623, and 633. For example, the plurality of electronic devices, i.e., first electronic device 10a, second electronic device 10b, and third electronic device 10c, may respectively generate Gaussian noise as the pieces of differential privacy protection data 613, 623, and 633.

According to an embodiment, the plurality of electronic devices, i.e., first electronic device 10a, second electronic device 10b, and third electronic device 10c, may respectively generate the pieces of differential privacy protection data 613, 623, and 633 based on information about a noise level received from the server 20. For example, the plurality of electronic devices, i.e., first electronic device 10a, second electronic device 10b, and third electronic device 10c, may respectively generate Gaussian noise as the pieces of differential privacy protection data 613, 623, and 633, based on a value of a noise constant and/or a standard deviation of the Gaussian noise set by the server 20. In detail, as shown in Equation 3, the first electronic device 10a may obtain the Gaussian noise 613, based on a ratio of a weight value of the first electronic device 10a, a weight value of the second electronic device 10b, and a weight value of the third electronic device 10c. The second electronic device 10b and the third electronic device 10c may respectively obtain the Gaussian noise 623 and 633 in a similar manner.

$$e_i \sim N(U, nw_i \sigma^2 I)$$ [Equation 3]

$e_i$ denotes Gaussian noise of an electronic device, n is the sum of weight values of a plurality of electronic devices, $w_i$ denotes a weight value of the electronic device, and σ denotes a standard deviation.

Moreover, referring to FIG. 6, at least the third electronic device 10c among the plurality of electronic devices, i.e., first electronic device 10a, second electronic device 10b, and third electronic device 10c, performing federated learning may be dropped out of the server 20. For example, the third electronic device 10c is not able to transmit the core AI update data 630 to the server 20 because it is dropped out of the server 20.

Accordingly, the sum of the pieces of data 610 and 620 received by the server 20 does not include differential privacy protection data corresponding to the noise level set by the server 20. Thus, a problem occurs in that the server 20 cannot refine the core AI model 29. Therefore, the server 20 may request each of the first electronic device 10a and the second electronic device 10b that respectively have transmitted the pieces of data 610 and 620 to the server 20 to modify and transmit differential privacy protection data thereof.

Figure 7:
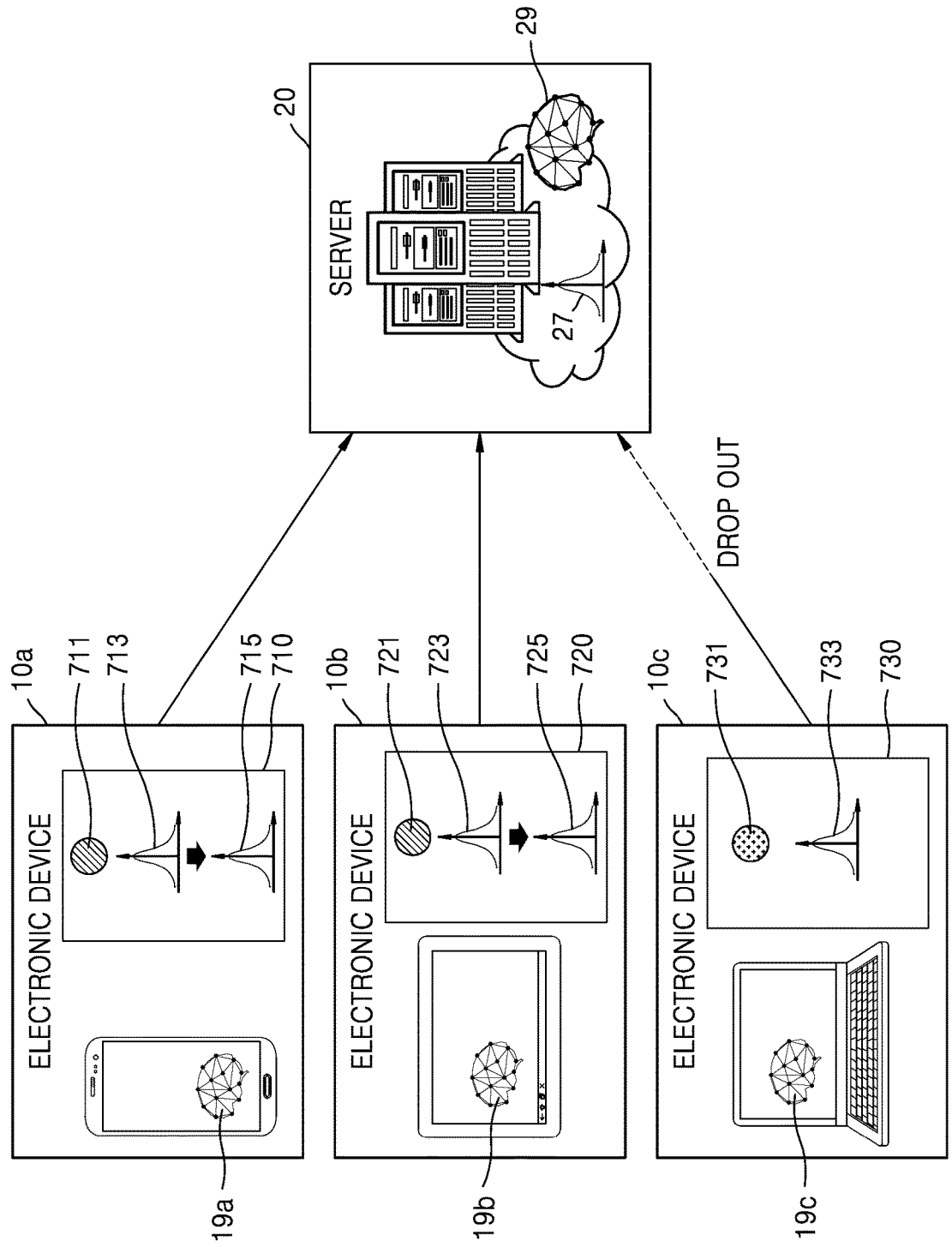
FIG. 7 is a diagram illustrating that a plurality of electronic devices modify differential privacy protection data, according to an embodiment.

FIG. 7 is a diagram illustrating that a plurality of electronic devices modify differential privacy protection data, according to an embodiment.

Referring to FIG. 7, each of the first electronic device 10a and the second electronic device 10b connected to the server 20 may transmit, to the server 20, differential privacy modification data used to modify first differential privacy protection data into second differential privacy protection data.

According to an embodiment, the first electronic device 10a and the second electronic device 10b may respectively modify pieces of first differential privacy protection data 713 and 723 into pieces of second differential privacy protection data 715 and 725, based on information related to the first electronic device 10a and the second electronic device 10b connected to the server 20. For example, the first electronic device 10a may modify first Gaussian noise 713 into second Gaussian noise 715 based on a ratio of a weight value of the first electronic device 10a and a weight value of the second electronic device 10b. As another example, the first electronic device 10a may modify the first Gaussian noise 713 into the second Gaussian noise 715 as shown in Equation 4, based on a sum of the weight values of the first electronic device 10a and the second electronic device 10b connected to the server 20 and the weight value of the first electronic device 10a. The second electronic device 10b may also modify the first Gaussian noise 723 into the second Gaussian noise 725 in a similar manner.

$$e_i \sim N(0, n'w_i \sigma'^2 I)$$ [Equation 4]

$e_i$ denotes Gaussian noise for an electronic device, n' denotes the sum of the weight values of the first electronic device 10a and the second electronic device 10b connected to the server 20, $w_i$ denotes a weight value of the electronic device, and σ' denotes a standard deviation newly set by the server 20.

Referring to Equation 2, the standard deviation is inversely proportional to n' that is the sum of weight values of the first electronic device 10a and the second electronic device 10b connected to the server 20. Accordingly, because the third electronic device 10c is disconnected (dropped out of the server 20, the standard deviation σ set by the server 20 is changed to the standard deviation σ' newly set by the server 20.

According to an embodiment, the first electronic device 10a and the second electronic device 10b may respectively modify the pieces of first differential privacy protection data 713 and 723 into the pieces of second differential privacy protection data 715 and 725, based on information related to the third electronic device 10c dropped out of the server 20. For example, the first electronic device 10a may modify the first differential privacy protection data 713 into the second differential privacy protection data 723, based on a value obtained by subtracting a weight value of the third electronic device 10c from the sum of the weight values of the plurality of electronic devices, i.e., first electronic device 10a, second electronic device 10b, and third electronic device 10c.

According to an embodiment, a sum of the pieces of first differential privacy protection data (e.g., a distribution of a sum of Gaussian noise) 713, 723, and 733 respectively corresponding to the plurality of electronic devices, i.e., first electronic device 10a, second electronic device 10b, and third electronic device 10c, may be equal to a sum of the pieces of second differential privacy protection data (e.g., a distribution of a sum of Gaussian noise) 715 and 725 respectively corresponding to the first electronic device 10a and the second electronic device 10b connected to the server 20.

According to an embodiment, each of the first electronic device 10a and the second electronic device 10b may modify the first differential privacy protection data into the second differential privacy protection data based on a noise level newly set by the server 20. For example, the first electronic device 10a may modify the first Gaussian noise 713 into the second Gaussian noise 715, based on a value of standard deviation/noise constant newly set by the server 20, the sum of the weight values of the first electronic device 10a and the second electronic device 10b connected to the server 20, and the weight value of the first electronic device 10a.

According to an embodiment, each of the first electronic device 10a and the second electronic device 10b may transmit, to the server 20, data including differential privacy modification data that is a difference value between the second differential privacy protection data and the first differential privacy protection data.

Figure 8:
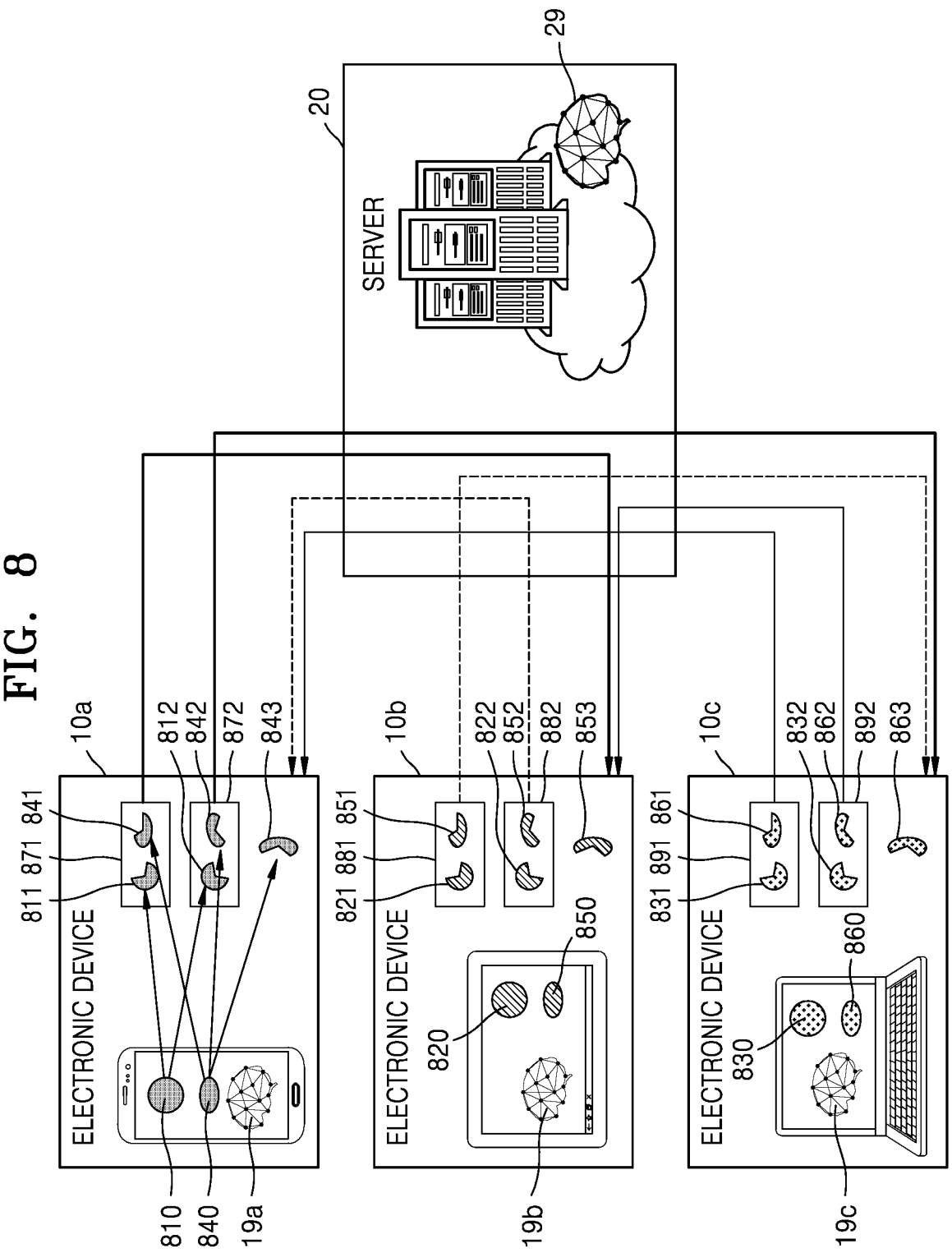
FIG. 8 is a diagram illustrating that a server unicasts shared keys of a plurality of electronic devices, according to an embodiment.

FIG. 8 is a diagram illustrating that a server unicasts shared keys of a plurality of electronic devices, according to an embodiment. FIG. 8 is a schematic diagram of operation 350.

Referring to FIG. 8, the plurality of electronic devices, i.e., first electronic device 10a, second electronic device 10b, and third electronic device 10c, may generate shared keys 871, 872, 881, 882, 891, and 892, and transmit the generated shared keys 871, 872, 881, 882, 891, and 892 to the server 20. In detail, the first electronic device 10a may generate the shared keys 871 and 872 to be respectively shared with the second electronic device 10b and the third electronic device 10c. The second electronic device 10b may generate the shared keys 881 and 882 to be respectively shared with the third electronic device 10c and the second electronic device 10b. The third electronic device 10c may generate the shared keys 891 and 892 to be respectively shared with the first electronic device 10a and the second electronic device 10b.

According to an embodiment, the plurality of electronic devices, i.e., first electronic device 10a, second electronic device 10b, and third electronic device 10c, may generate pieces of partial data 841, 851, 861, 842, 852, 862, 843, 853, and 863 respectively from pieces of masking data 840, 850, and 860. The plurality of electronic devices, i.e., first electronic device 10a, second electronic device 10b, and third electronic device 10c, may respectively generate the pieces of partial data 841, 851, 861, 842, 852, 862, 843, 853, and 863 of the pieces of masking data such that some of the pieces of partial data 841, 851, 861, 842, 852, 862, 843, 853, and 863 thereof overlap each other. The pieces of partial data 841, 842, 843, 851, 852, 853, 861, 862, and 863 of the pieces of masking data may be generated according to a certain rule so that the pieces of masking data may be restored by the server 20.

According to an embodiment, the plurality of electronic devices, i.e., first electronic device 10a, second electronic device 10b, and third electronic device 10c, may generate pieces of partial data 811, 821, 831, 812, 822, and 832 respectively from secure keys 810, 820, and 830. The plurality of electronic devices, i.e., first electronic device 10a, second electronic device 10b, and third electronic device 10c, may generate the pieces of partial data 811, 821, 831, 812, 822, and 832 of the secure keys so that some of the pieces of partial data 811, 821, 831, 812, 822, and 832 overlap each other. The pieces of partial data 811, 812, 821, 822, 831, and 832 of the secure keys may be generated according to a certain rule so that the secure keys may be restored by the server 20.

According to an embodiment, a shared key may include at least one of partial data of a secure key of an electronic device and partial data of masking data of the electronic device. For example, the first electronic device 10a may generate the shared key 871 including the partial data 811 of the secure key 810 of the first electronic device 10a and the partial data 841 of the masking data 840 thereof and the shared key 872 including the partial data 812 of the secure key 810 of the first electronic device 10a and the partial data 842 of the masking data 840 thereof. The second electronic device 10b may generate the shared key 881 including the partial data 821 of the secure key 820 of the second electronic device 10b and the partial data 851 of the masking data 850 thereof and the shared key 882 including the partial data 822 of the secure key 820 of the second electronic device 10b and the partial data 852 of the masking data 850 thereof. The third electronic device 10c may generate the shared key 891 including the partial data 831 of the secure key 830 of the third electronic device 10c and the partial data 861 of the masking data 860 thereof and the shared key 892 including the partial data 832 of the secure key 830 of the third electronic device 10c and the partial data 862 of the masking data 860 thereof.

According to an embodiment, a shared key may include target information. For example, the first shared key 871 generated by the first electronic device 10a to share the first shared key 871 with the second electronic device 10b may include identification information of the second electronic device 10b as destination information.

The server 20 may unicast, to each of the plurality of electronic devices, i.e., first electronic device 10a, second electronic device 10b, and third electronic device 10c, a corresponding one of the shared keys 871, 872, 881, 882, and 891 and 892 received from the plurality of electronic devices, i.e., first electronic device 10a, second electronic device 10b, and third electronic device 10c.

According to an embodiment, the server 20 may unicast shared keys based on pieces of target information respectively included in the shared keys 871, 872, 881, 882, 891 and 892.

Figure 9:
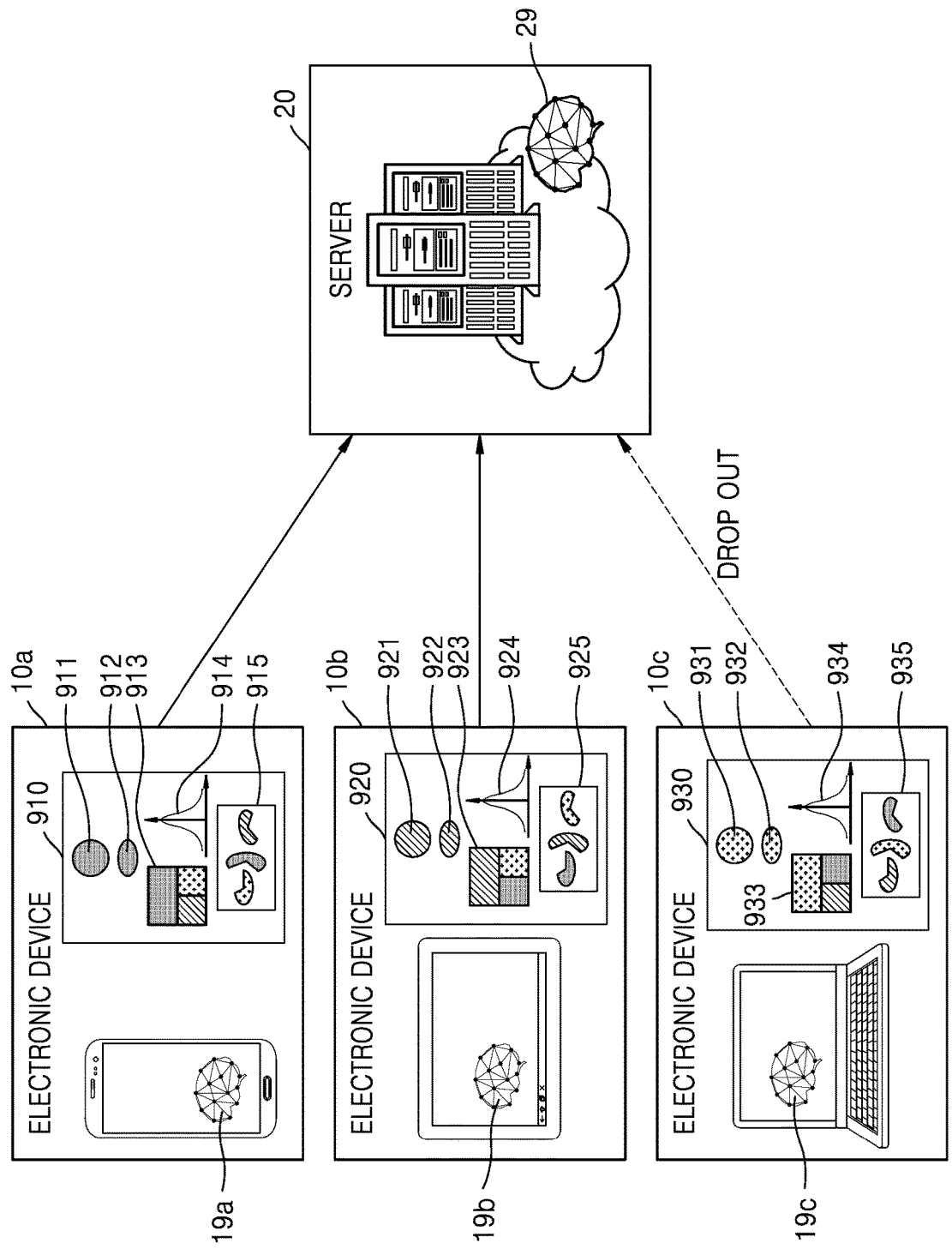
FIG. 9 is a diagram illustrating that a server receives data from each of a plurality of electronic devices except for a disconnected electronic device, according to an embodiment.

FIG. 9 is a diagram illustrating that a server receives data from each of a plurality of electronic devices except for a disconnected electronic device, according to an embodiment.

Referring to FIG. 9, the plurality of electronic devices, i.e., first electronic device 10a, second electronic device 10b, and third electronic device 10c, may respectively transmit, to the server 20, pieces of core AI update data 910, 920, and 930 in order to refine the core AI model 29.

According to an embodiment, the pieces of data 910, 920, and 930 transmitted by the plurality of electronic devices, i.e., first electronic device 10a, second electronic device 10b, and third electronic device 10c, respectively include pieces of private data 911, 921, and 931, pieces of first masking data 912, 922, and 932, second masking data 913, 923, and 933, pieces of differential privacy protection data 914, 924, and 934, and shared secure data 915, 925, and 935. For example, the first electronic device 10a may transmit, to the server 20, the data 910 including the private data 911 of the first electronic device 10a, the first masking data 912 of the first electronic device 10a, the differential privacy protection data 914 of the first electronic device 10a, and the shared secure data 915 of the first electronic device 10a.

According to an embodiment, the plurality of electronic devices, i.e., first electronic device 10a, second electronic device 10b, and third electronic device 10c, may respectively generate the pieces of first masking data 912, 922, and 932. The pieces of first masking data 912, 922, and 932 are data for protecting the corresponding private data so that the private data is not specified, and may be randomly generated by the plurality of electronic devices, i.e., first electronic device 10a, second electronic device 10b, and third electronic device 10c, respectively, according to a certain rule.

According to an embodiment, the plurality of electronic devices, i.e., first electronic device 10a, second electronic device 10b, and third electronic device 10c, may respectively generate the pieces of second masking data 913, 923, and 933. The pieces of second masking data 913, 923, and 933 are data for protecting the corresponding private data so that the private data is not specified, and may be respectively generated by the plurality of electronic devices, i.e., first electronic device 10a, second electronic device 10b, and third electronic device 10c, based on secure keys and public keys. For example, the second electronic device 10b may generate the second masking data 923, based on a secure key of the second electronic device 10b, a public key of the first electronic device 10a, and a public key of the third electronic device 10c. In detail, the second electronic device 10b may generate the second masking data 923 by subtracting a value obtained by performing a calculation on the public key of the first electronic device 10a and the secure key of the second electronic device 10b (e.g., a value obtained by raising the public key of the first electronic device to the power of the secure key of the second electronic device) and adding a value obtained by performing a calculation on the public key of the third electronic device 10c and the secure key of the second electronic device 10b (e.g., a value obtained by raising the public key of the third electronic device to the power of the secure key of the second electronic device).

Moreover, referring to FIG. 9, the third electronic device 10c dropped out of the server 20 cannot transmit the data 930 for refining the core AI model 29 to the server 20. The server 20 may remove a sum of the pieces of masking data from a sum of the pieces of data respectively received from the first electronic device 10a and the second electronic device 10b.

Because the data 930 is not transmitted, the server 20 needs to obtain, from the pieces of data 910 and 920, a sum of the pieces of private data 911 and 921 to which differential privacy protection data is added. A detailed method is described below with reference to FIG. 10.

Figure 10:
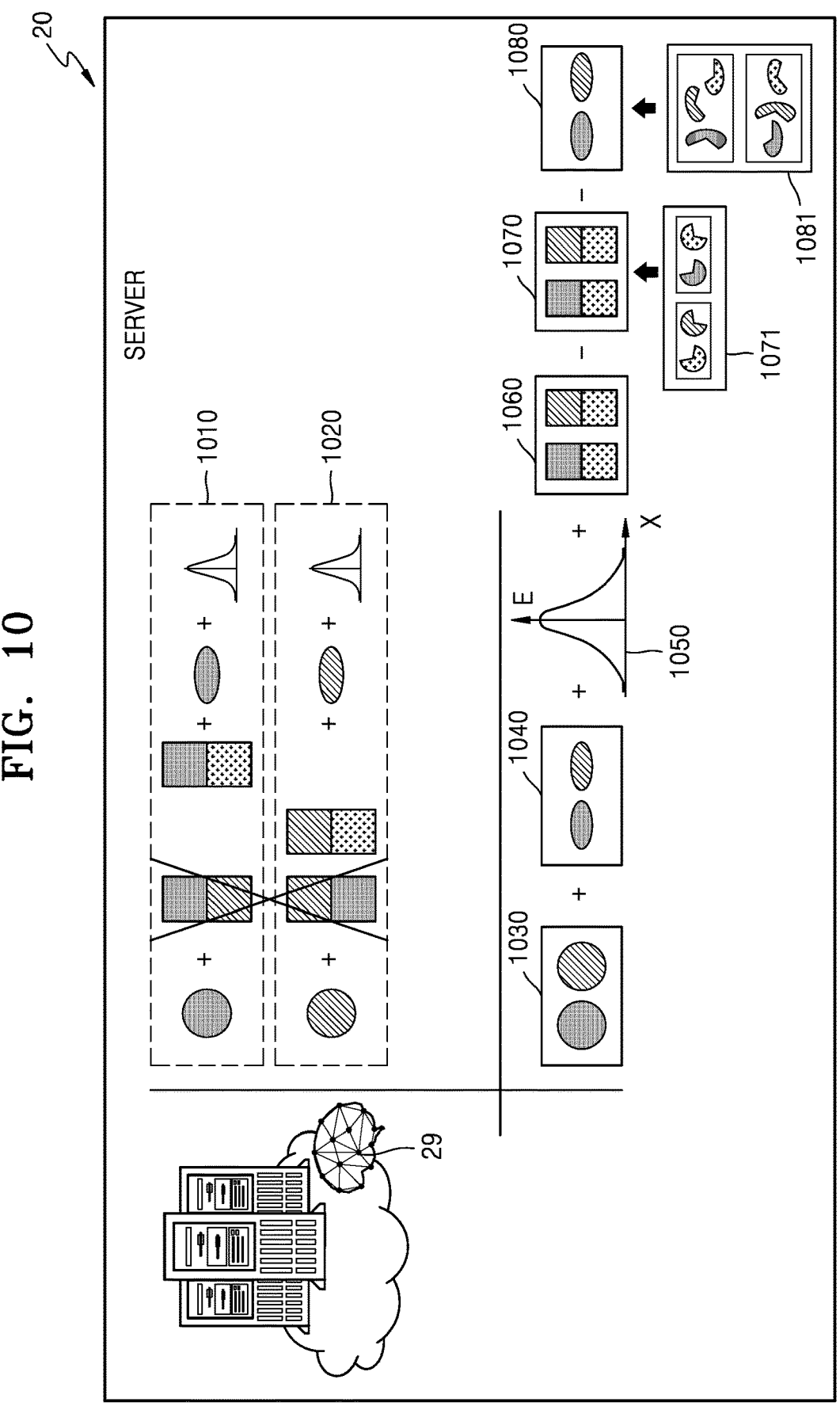
FIG. 10 is a diagram illustrating that a server obtains, from received pieces of data, a sum of pieces of private data to which differential privacy protection data is added, according to an embodiment.

FIG. 10 is a diagram illustrating that a server obtains, from received data, a sum of pieces of private data to which differential privacy protection data is added, according to an embodiment.

Referring to FIG. 10, the server 20 may obtain, from received pieces of data 1010 and 1020, a sum 1030 of pieces of private data to which differential privacy protection data 1050 is added. Each of the pieces of data 1010 and 1020 may include private data, masking data, a secure key, differential privacy protection data, and shared secure data.

As described above with reference to FIG. 7, the server 20 may identify the disconnected third electronic device 10c. The server 20 may transmit, to the first electronic device 10a and the second electronic device 10b connected to the server 20, information about the third electronic device 10c or information about the first electronic device 10a and the second electronic device 10b connected to the server 20. Each of the first electronic device 10a and the second electronic device 10b may modify differential privacy protection data based on information about the third electronic device 10c (e.g., identification information of the third electronic device, a weight value of the third electronic device, etc.). Each of the first electronic device 10a and the second electronic device 10b may transmit, to the server 20, differential privacy modification data used to modify differential privacy protection data.

According to an embodiment, the server 20 may remove the first masking data 1040 from the received pieces of data 1010 and 1020. The server 20 may obtain pieces of partial data 1081 of the first masking data 1040 from pieces of shared secure data respectively included in the received pieces of data 1010 and 1020. The server 20 may restore the first masking data 1040 from the pieces of partial data 1081 of the first masking data 1040. The server 20 may remove the first masking data 1040 from the sum of the pieces of data 1010 and 1020 by using the restored first masking data 1080.

According to an embodiment, the server 20 may remove second masking data 1060 from the received pieces of data 1010 and 1020. The server 20 may obtain pieces of partial data 1071 of a secure key from the pieces of shared secure data respectively included in the received pieces of data 1010 and 1020. The server 20 may restore a secure key of the third electronic device 10*c* dropped out of the server 20 from the pieces of partial data 1071 of the secure key. The server 20 may restore the second masking data 1060 by using the restored secure key. The server 20 may remove the second masking data 1060 from the sum of the pieces of data 1010 and 1020 by using the restored second masking data 1070.

The server 20 may obtain the sum 1030 of the pieces of private data to which the differential privacy protection data 1050 is added by removing the pieces of masking data 1040 and 1060 from the received pieces of data 1010 and 1020. The server 20 may refine the core AI model 29 by using the sum 1030 of the pieces of private data to which the differential privacy protection data 1050 is added.

Figure 11:
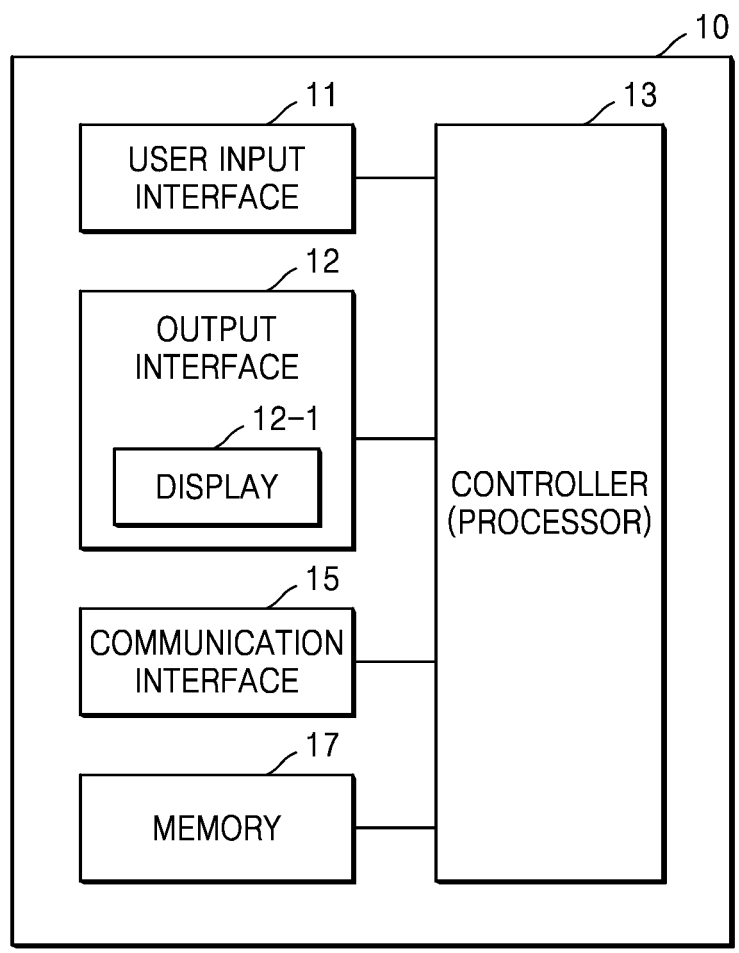
FIG. 11 is a block diagram of an electronic device according to an embodiment.

FIG. 11 is a block diagram of an electronic device according to an embodiment.

Referring to FIG. 11, the electronic device 10 may include a user input interface 11, an output interface 12, a processor 13, a communication interface 15, and a memory 17. However, all of the components shown in FIG. 11 are not essential components of the electronic device 10. The electronic device 10 may be implemented with more or fewer components than those shown in FIG. 11.

The user input interface 11 is a means via which a user inputs data necessary for controlling the electronic device 10. Examples of the user input interface 11 may include, but are not limited to, a keypad, a dome switch, a touch pad (a capacitive overlay type, a resistive overlay type, an infrared beam type, a surface acoustic wave type, an integral strain gauge type, a piezoelectric type, etc.), a jog wheel, a jog switch, etc.

The user input interface 11 may receive a user input necessary for the electronic device 10 to implement the embodiments described with reference to FIGS. 1 to 10.

The output interface 12 outputs information processed by the electronic device 10. The output interface 12 may output information related to the embodiments described with reference to FIGS. 1 to 10.

The processor 13 generally controls all operations of the electronic device 10. For example, the processor 13 may generally control the user input interface 11, the output interface 12, the communication interface 15, the memory 17, etc. by executing at least one instruction stored in the memory 17. For example, the processor 13 may control the communication interface 15 to transmit or receive data to or from the server 20.

The processor 13 may be at least one general-purpose processor. Furthermore, the processor 13 may include at least one processor manufactured to perform functions of an AI model. The processor 13 may execute a series of instructions so that the AI model learns new training data.

The processor 13 may perform functions of the AI model described above with reference to FIGS. 1 to 10 by executing software modules stored in the memory 17.

For example, by executing a private data acquisition module 17*a*, the processor 13 may obtain private data that is information about a modified weight value among weight values of neural network layers of an AI model built in the electronic device 10. The processor 13 may generate vector-type data including the obtained private data. Descriptions of the embodiments already provided above with reference to FIGS. 1 to 10 are omitted below.

In another example, by executing a public key generation module 17*b*, the processor 13 may generate a public key that is data indicating that the electronic device 10 corresponds to a device performing federated learning with external devices (e.g., another electronic device and a server). The processor 13 may generate a public key including identification information of the electronic device 10. The processor 13 may generate a public key including a weight value for the electronic device 10, which indicates the importance of private data. Descriptions of the embodiments already provided above with reference to FIGS. 1 to 10 are omitted below.

In another example, by executing a shared key generation module 17*c*, the processor 13 may generate a shared key that is data that the electronic device 10 shares with another electronic device performing the federated learning therewith. The processor 13 may generate a shared key including partial data of a secure key of the electronic device 10 and partial data of masking data of the electronic device 10. The processor 13 may generate a shared key including identification information of an electronic device to which the shared key is to be transmitted. Descriptions of the embodiments already provided above with reference to FIGS. 1 to 10 are omitted below.

In another example, by executing a differential privacy protection data generation module 17*d*, the processor 13 may generate differential privacy protection data (e.g., Gaussian noise) that is data used to encrypt private data by using a differential privacy technique so that the private data is not specified. The processor 13 may generate differential privacy protection data, based on a weight value of the electronic device 10, a sum of weight values for a plurality of electronic devices performing federated learning with the electronic device 10, and a noise level received from the server 20. Descriptions of the embodiments already provided above with reference to FIGS. 1 to 10 are omitted below.

As another example, the processor 13 may generate core AI update data by executing instructions stored in the memory 17. The processor 13 may generate, as vector-type data, core AI update data including private data, masking data, differential privacy protection data, and shared secure data of the electronic device 10. Descriptions of the embodiments already provided above with reference to FIGS. 1 to 10 are omitted below.

As another example, the processor 13 may generate differential privacy modification data used to modify differential privacy protection data by executing instructions stored in the memory 17. Descriptions of the embodiments already provided above with reference to FIGS. 1 to 10 are omitted below.

The communication interface 15 may include one or more components that allow the electronic device 10 to communicate with another device (not shown) and the server 20. The other device may be a computing device such as the electronic device 10, but is not limited thereto.

The memory 17 may store at least one instruction and at least one program necessary for processing or control by the processor 13 and store data input to or output from the electronic device 10.

The memory 17 may include at least one type of storage medium from among memories that temporarily store data, such as random access memory (RAM) and static RAM (SRAM), and data storages that permanently store data, such as a flash memory-type memory, a hard disk-type memory, a multimedia card micro-type memory, a card-type memory (e.g., an SD card or an XD memory), read-only memory (ROM), electrically erasable programmable ROM (EEPROM), PROM, a magnetic memory, a magnetic disc, and an optical disc.

Figure 12:
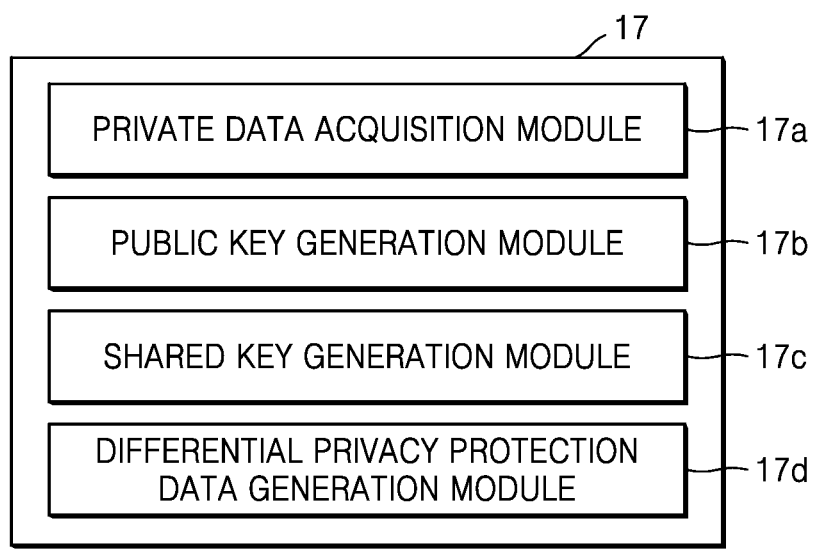
FIG. 12 is a block diagram illustrating software modules of a memory included in an electronic device, according to an embodiment.

FIG. 12 is a block diagram illustrating software modules of a memory included in an electronic device, according to an embodiment.

Referring to FIG. 12, the memory 17 may include the private data acquisition module 17a, the public key generation module 17b, the shared key generation module 17c, and the differential privacy protection data generation module 17d as software modules including instructions for the electronic device 10 to implement the embodiments described above with reference to FIGS. 1 to 10. However, the electronic device 10 may perform federated learning with the server 20 by using more or fewer software modules than those shown in FIG. 12.

For example, as the processor 13 executes instructions included in the private data acquisition module 17a, the electronic device 10 may obtain private data that is information about a modified weight value among weight values of neural network layers of an AI model built in the electronic device 10. The electronic device 10 may generate vector-type data including the obtained private data. Descriptions of the embodiments already provided above with reference to FIGS. 1 to 10 are omitted below.

In another example, as the processor 13 executes instructions included in the public key generation module 17b, the electronic device 10 may generate a public key that is data indicating that the electronic device 10 corresponds to a device performing federated learning with external devices (e.g., another electronic device and a server). The electronic device 10 may generate a public key including identification information of the electronic device 10. The electronic device 10 may generate a public key including a weight value for the electronic device 10, which indicates the importance of private data. Descriptions of the embodiments already provided above with reference to FIGS. 1 to 10 are omitted below.

As another example, as the processor 13 executes instructions included in the shared key generation module 17c, the electronic device 10 may generate a shared key that is data that the electronic device 10 shares with another electronic device performing the federated learning therewith. The electronic device 10 may generate a shared key including partial data of a secure key of the electronic device 10 and partial data of masking data of the electronic device 10. The electronic device 10 may generate a shared key including identification information of an electronic device to which the shared key is to be transmitted. Descriptions of the embodiments already provided above with reference to FIGS. 1 to 10 are omitted below.

In another example, as the processor 13 executes instructions included in the differential privacy protection data generation module 17d, the electronic device 10 may generate differential privacy protection data (e.g., Gaussian noise) that is data used to encrypt private data by using a differential privacy technique so that the private data is not specified. The electronic device 10 may generate differential privacy protection data, based on a weight value of the electronic device 10, a sum of weight values for a plurality of electronic devices performing federated learning with the electronic device 10, and a noise level received from the server 20. Furthermore, the electronic device 10 may generate differential privacy modification data used to modify differential privacy protection data. Descriptions of the embodiments already provided above with reference to FIGS. 1 to 10 are omitted below.

Figure 13:
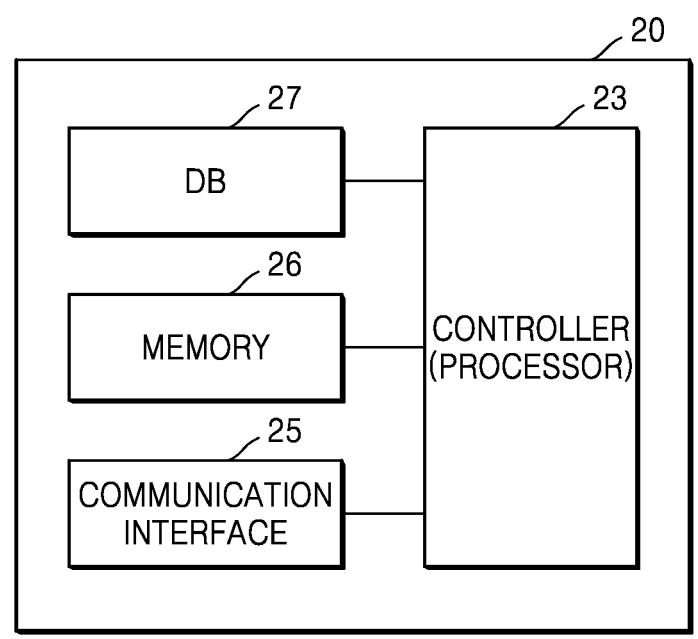
FIG. 13 is a block diagram of a server according to an embodiment.

FIG. 13 is a block diagram of a server according to an embodiment.

According to some embodiments, the server 20 may include a communication interface 25, a database (DB) 27, and a processor 23.

The communication interface 25 may include one or more components that allow the server 20 to communicate with the electronic device 10.

The DB 27 may store data received from the electronic device 10. The DB 27 may store data and programs necessary for performing federated learning with the electronic device 10. The DB 27 may store data created by backing up the core AI model 29. The DB 27 may store a history of refinement of the core AI model 29.

The processor 23 generally controls all operations of the server 20. For example, the processor 23 may generally control the DB 27, the communication interface 25, etc. by executing programs stored in a memory 26 of the server 20. The processor 23 may perform the operations of the server 20 described with reference to FIGS. 1 to 10 by executing the programs.

For example, by executing a broadcasting module 26a, the processor 23 may broadcast public keys received from a plurality of electronic devices to the plurality of electronic devices. The processor 23 may generate broadcast data including information about weight values of the plurality of electronic devices and information about a noise level. The processor 23 may transmit the generated broadcast data to the plurality of electronic devices. Descriptions of the embodiments already provided above with reference to FIGS. 1 to 10 are omitted below.

As another example, by executing a unicasting module 26b, the processor 23 may unicast each of shared keys received from the plurality of electronic devices. The processor 23 may unicast a shared key based on identification information of an electronic device to which the shared key is to be transmitted, the identification information being included in the shared key. When unicasting, the processor 23 may transmit, to each of the plurality of electronic devices, data for requesting transmission of vector-type data including private data. Descriptions of the embodiments already provided above with reference to FIGS. 1 to 10 are omitted below.

As another example, by executing an electronic device identification module 26c, the processor 23 may identify a state of connection with each of the plurality of electronic devices that perform federated learning with the server 20. The processor 23 may control the communication interface 25 to transmit and receive data for periodically checking a state of connection with each of the plurality of electronic devices. Descriptions of the embodiments already provided above with reference to FIGS. 1 to 10 are omitted below.

As another example, by executing a differential privacy protection data calculation module 26d, the processor 23 may set a noise level indicating a sum of pieces of differential privacy protection data. Descriptions of the embodiments already provided above with reference to FIGS. 1 to 10 are omitted below.

As another example, by executing an AI model refinement module 26e, the processor 23 may obtain, from pieces of core AI update data received from the plurality of electronic devices, a sum of pieces of private data to which pieces of differential privacy protection data are respectively added. The processor 23 may subtract masking data from core AI update data. Descriptions of the embodiments already provided above with reference to FIGS. 1 to 10 are omitted below.

Figure 14:
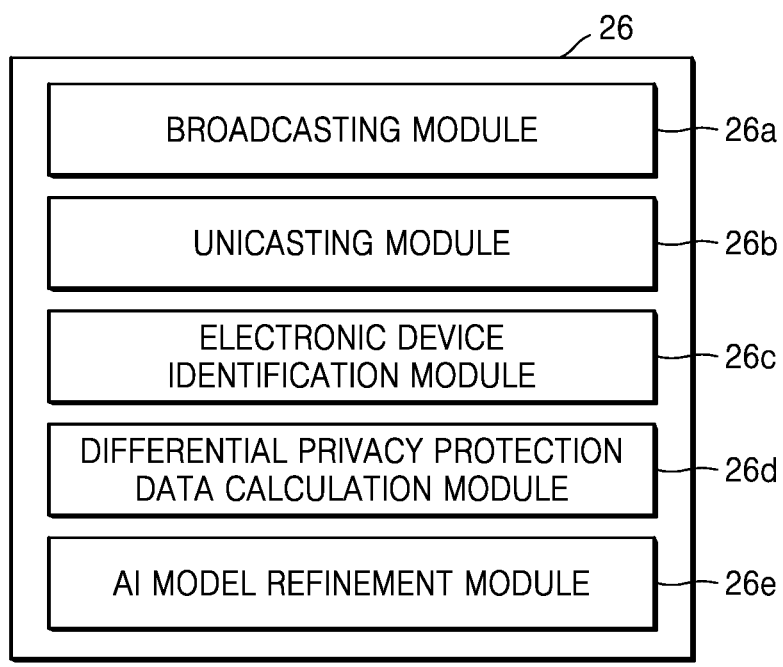
FIG. 14 is a block diagram illustrating software modules of a memory included in a server, according to an embodiment.

FIG. 14 is a block diagram illustrating software modules of a memory included in a server, according to an embodiment.

Referring to FIG. 14, the memory 26 may include the broadcasting module 26a, the unicasting module 26b, the electronic device identification module 26c, the differential privacy protection data calculation module 26d, and the AI model refinement module 26e as software modules for the server 20 to implement the embodiments described above with reference to FIGS. 1 to 10. However, the server 20 may perform federated learning with the electronic device 10 by using more or fewer software modules than those shown in FIG. 14.

For example, as the processor 23 executes instructions included in the broadcasting module 26a, the server 20 may broadcast public keys received from a plurality of electronic devices to the plurality of electronic devices. The server 20 may generate broadcast data including information about weight values of the plurality of electronic devices and information about a noise level. The server 20 may transmit the generated broadcast data to the plurality of electronic devices. Descriptions of the embodiments already provided above with reference to FIGS. 1 to 10 are omitted below.

As another example, as the processor 23 executes instructions included in the unicasting module 26b, the server 20 may unicast each of the shared keys received from the plurality of electronic devices. The server 20 may unicast a shared key based on identification information of an electronic device to which the shared key is to be transmitted, the identification information being included in the shared key. When unicasting, the server 20 may transmit, to each of the plurality of electronic devices, data for requesting transmission of vector-type data including private data. Descriptions of the embodiments already provided above with reference to FIGS. 1 to 10 are omitted below.

As another example, as the processor 23 executes instructions included in the electronic device identification module 26c, the server 20 may identify a state of connection with the plurality of electronic devices that perform federated learning with the server 20. The server 20 may transmit and receive data for periodically checking a state of connection with each of the plurality of electronic devices. Descriptions of the embodiments already provided above with reference to FIGS. 1 to 10 are omitted below.

As another example, as the processor 23 executes instructions included in the differential privacy protection data calculation module 26d, the server 20 may set a noise level indicating a sum of pieces of differential privacy protection data. Descriptions of the embodiments already provided above with reference to FIGS. 1 to 10 are omitted below.

As another example, as the processor 23 executes instructions included in the AI model refinement module 26e, the server 20 may obtain, from pieces of core AI update data received from the plurality of electronic devices, a sum of pieces of private data to which pieces of differential privacy protection data are respectively added. The server 20 may subtract masking data from core AI update data. Descriptions of the embodiments already provided above with reference to FIGS. 1 to 10 are omitted below.

Moreover, according to the embodiments described with reference to FIGS. 1 to 14, even when the electronic device 10 performing federated learning with the server 20 is dropped out of the server 20, security of private data of the electronic device 10 may be maintained.

Accordingly, the embodiments of the disclosure may be used in services for performing federated learning by using data related to personal privacy. For example, the embodiments of the disclosure may be used in services for performing federated learning by using personal biometric data (e.g., a height, a weight, a blood pressure, a pulse, etc.). As another example, the embodiments of the disclosure may be used in services for performing federated learning by using personal medical data (e.g., medical images, a disease history, a medication history, a medical treatment history, etc.).

Some embodiments may be implemented in the form of recording media including instructions executable by a computer, such as a program module executed by the computer. The computer-readable recording media may be any available media that are accessible by the computer, and include both volatile and non-volatile media and both removable and non-removable media. Furthermore, the computer-readable recording media may include computer storage media. The computer storage media include both volatile and non-volatile and both removable and non-removable media implemented in any method or technology for storage of information, such as computer-readable instructions, data structures, program modules, or other data.

The invention claimed is:

1. A method, performed by a server, of refining a core artificial intelligence (AI) model in the server, the method comprising:
   transmitting, to each of a plurality of electronic devices performing federated learning with the core AI model, data for requesting first data used for refining the core AI model;
   receiving the first data from at least one of the plurality of electronic devices;
   identifying an electronic device that transmitted the first data from among the plurality of electronic devices;
   transmitting data for requesting second data, to the electronic device that transmitted the first data from among the plurality of electronic devices, based on a result of the identifying;
   receiving the second data from the electronic device that transmitted the first data; and
   refining the core AI model by using the first data and the second data,
   wherein the first data includes first differential privacy protection data for protecting private data of each of the plurality of electronic devices, and
   the second data includes differential privacy modification data used to modify the first differential privacy protection data into second differential privacy protection data, based on the result of the identifying.

2. The method of claim 1, wherein
the transmitting of the data for requesting the first data comprises:
   receiving pieces of identification information of the plurality of electronic devices respectively from the plurality of electronic devices;
   setting a noise level based on the received pieces of identification information; and
   transmitting information about the noise level to the plurality of electronic devices, and
wherein the first differential privacy protection data is generated by each of the plurality of electronic devices, based on the noise level.

3. The method of claim 2, wherein the information about the noise level includes information about a sum of pieces of first differential privacy protection data to be respectively received from the plurality of electronic devices, and
wherein the receiving of the first data comprises receiving, from a first electronic device among the plurality of electronic devices, first differential privacy protection data of the first electronic device, which is generated by the first electronic device based on the information about the sum of the pieces of first differential privacy protection data and a weight value of the first electronic device.

4. The method of claim 3, wherein
the transmitting of the data for requesting the second data comprises transmitting, to the first electronic device, identification information of the electronic device that transmitted the first data,
the receiving of the second data comprises receiving, from the first electronic device, differential privacy modification data of the first electronic device, which is generated by the first electronic device based on the information about the sum of the pieces of first differential privacy protection data, the identification information of the electronic device that transmitted the first data, and the weight value of the first electronic device, and
the sum of the pieces of first differential privacy protection data to be respectively received from the plurality of electronic devices is equal to a sum of pieces of second differential privacy protection data obtained via modification using pieces of differential privacy modification data to be received by the server from respective ones of electronic devices that transmitted the first data.

5. The method of claim 4, wherein the receiving of the second data further comprises receiving, from the first electronic device, the differential privacy modification data that is a difference value between the second differential privacy protection data of the first electronic device and the first differential privacy protection data of the first electronic device.

6. The method of claim 1, wherein
the transmitting of the data for requesting the first data comprises:
receiving a first public key from a first electronic device among the plurality of electronic devices and receiving a second public key from a second electronic device among the plurality of electronic devices;
broadcasting the first public key and the second public key;
receiving a first shared key from the first electronic device and receiving a second shared key from the second electronic device; and
unicasting the first shared key to the second electronic device and unicasting the second shared key to the first electronic device,
wherein the first shared key includes at least a portion of first masking data for protecting first private data of the first electronic device, and
the second shared key includes at least a portion of second masking data for protecting second private data of the second electronic device, and
wherein the receiving of the first data comprises receiving the first masking data from the first electronic device and receiving the second masking data from the second electronic device, and
the receiving of the second data comprises receiving, from the first electronic device, first shared secure data generated based on the first shared key to remove the first masking data, and receiving, from the second electronic device, second shared secure data generated based on the second shared key to remove the second masking data.

7. The method of claim 6, wherein
the first shared key includes at least a portion of a secure key of the first electronic device, and
the second shared key includes at least a portion of a secure key of the second electronic device, and
wherein the receiving of the first data further comprises receiving, from the first electronic device, third masking data generated using a first secure key, and receiving, from the second electronic device, fourth masking data generated using a second secure key, and
the receiving of the second data further comprises receiving, from the first electronic device, the first shared secure data generated based on the first shared key to remove the third masking data, and receiving, from the second electronic device, the second shared secure data generated based on the second shared key to remove the fourth masking data.

8. A method, performed by a first electronic device, of performing federated learning, the first electronic device being among a plurality of electronic devices that perform the federated learning with a core artificial intelligence (AI) model in a server, the method comprising:
receiving, from the server, data for requesting first data used for refining the core AI model;
transmitting, to the server, the first data of the first electronic device, the first data including first differential privacy protection data of the first electronic device for protecting private data of the first electronic device;
receiving, from the server, data for requesting second data of the first electronic device;
generating differential privacy modification data used to modify the first differential privacy protection data of the first electronic device into second differential privacy protection data of the first electronic device, based on a result of identifying an electronic device that transmitted the first data from among the plurality of electronic devices; and
transmitting, to the server, the second data of the first electronic device, the second data including the differential privacy modification data.

9. The method of claim 8, wherein
the receiving of the data for requesting the first data comprises receiving information about a noise level set based on pieces of identification information of the plurality of electronic devices,
the information about the noise level includes information about a sum of pieces of first differential privacy protection data to be received by the server from respective ones of the plurality of electronic devices, and
the transmitting of the first data comprises:
generating the first differential privacy protection data of the first electronic device, based on the information about the sum of the pieces of first differential privacy protection data and a weight value of the first electronic device; and
transmitting, to the server, the first data of the first electronic device, the first data including the first differential privacy protection data of the first electronic device.

10. The method of claim 9, wherein
the receiving of the data for requesting of the second data further comprises receiving, from the server, identification information of the electronic device that transmitted the first data from among the plurality of electronic devices, the transmitting of the second data comprises generating the differential privacy modification data of the first electronic device, based on the information about the sum of the pieces of first differential privacy protection data, the identification information of the electronic device that transmitted the first data, and the weight value of the first electronic device, and the sum of the pieces of first differential privacy protection data to be received by the server from respective ones of the plurality of electronic devices is equal to a sum of pieces of second differential privacy protection data obtained via modification using pieces of differential privacy modification data to be received by the server from respective ones of the plurality of electronic devices.

11. A server for performing federated learning with a plurality of electronic devices and in which a core artificial intelligence (AI) model is stored, the server comprising:
a communication interface;
a memory storing one or more instructions; and
a processor configured to execute the one or more instructions to:
control the communication interface to request first data used for refining the core AI model from each of the plurality of electronic devices and receive the first data from at least one of the plurality of electronic devices,
identify an electronic device that transmitted the first data from among the plurality of electronic devices,
control the communication interface to request, based on a result of the identifying, second data to the electronic device that transmitted the first data from among the plurality of electronic devices and receive the second data from the electronic device that transmitted the first data, and
refine the core AI model by using the first data and the second data,
wherein the first data includes first differential privacy protection data for protecting private data of each of the plurality of electronic devices, and
the second data includes differential privacy modification data used to modify the first differential privacy protection data into second differential privacy protection data, based on the result of the identifying.

12. The server of claim 11, wherein
the processor is further configured to:
control the communication interface to receive pieces of identification information of the plurality of electronic devices respectively from the plurality of electronic devices,
set a noise level based on the received pieces of identification information, and
control the communication interface to transmit information about the noise level to the plurality of electronic devices, and
wherein the first differential privacy protection data is generated by each of the plurality of electronic devices, based on the noise level.

13. The server of claim 12, wherein the information about the noise level includes information about a sum of pieces of first differential privacy protection data to be respectively received from the plurality of electronic devices, and
wherein the processor is further configured to control the communication interface to receive, from a first electronic device among the plurality of electronic devices, first differential privacy protection data of the first electronic device, which is generated by the first electronic device based on the information about the sum of the pieces of first differential privacy protection data and a weight value of the first electronic device.

14. The server of claim 13, wherein
the processor is further configured to control the communication interface to transmit, to the first electronic device, identification information of the electronic device that transmitted the first data and receive, from the first electronic device, differential privacy modification data of the first electronic device, which is generated by the first electronic device based on the information about the sum of the pieces of first differential privacy protection data, the identification information of the electronic device that transmitted the first data, and the weight value of the first electronic device, and
the sum of the pieces of first differential privacy protection data to be respectively received from the plurality of electronic devices is equal to a sum of pieces of second differential privacy protection data obtained via modification using pieces of differential privacy modification data to be received by the server from respective ones of electronic devices that transmitted the first data.

15. The server of claim 14, wherein the processor is further configured to control the communication interface to receive, from the first electronic device, the differential privacy modification data that is a difference value between the second differential privacy protection data of the first electronic device and the first differential privacy protection data of the first electronic device.

16. The server of claim 11, wherein
the processor is further configured to control the communication interface to receive a first public key from a first electronic device among the plurality of electronic devices, receive a second public key from a second electronic device among the plurality of electronic devices, broadcast the first public key and the second public key, receive a first shared key from the first electronic device and receive a second shared key from the second electronic device, unicast the first shared key to the second electronic device, and unicast the second shared key to the first electronic device,
wherein the first shared key includes at least a portion of first masking data for protecting first private data of the first electronic device, and
the second shared key includes at least a portion of second masking data for protecting second private data of the second electronic device, and
wherein the processor is further configured to receive first data including the first masking data from the first electronic device, receive second data including the second masking data from the second electronic device, receive, from the first electronic device, first shared secure data generated based on the first shared key to remove the first masking data, and receive, from the second electronic device, second shared secure data generated based on the second shared key to remove the second masking data.

17. The server of claim 16, wherein the first shared key includes at least a portion of a secure key of the first electronic device, and
the second shared key includes at least a portion of a secure key of the second electronic device, and wherein the processor is further configured to receive, from the first electronic device, first data including third masking data generated using a first secure key, receive, from the second electronic device, second data including fourth masking data generated using a second secure key, receive, from the first electronic device, the first shared secure data generated based on the first shared key to remove the third masking data, and receive, from the second electronic device, the second shared secure data generated based on the second shared key to remove the fourth masking data.

18. A first electronic device among a plurality of electronic devices that perform federated learning with a core artificial intelligence (AI) model in a server, the first electronic device comprising:
   a communication interface;
   a memory storing one or more instructions; and
   a processor configured to execute the one or more instructions to:
      control the communication interface to receive, from the server, data for requesting first data used for refining the core AI model, transmit, to the server, the first data of the first electronic device, the first data including first differential privacy protection data of the first electronic device for protecting private data of the first electronic device, and receive, from the server, data for requesting second data of the first electronic device,
      generate differential privacy modification data used to modify the first differential privacy protection data of the first electronic device into second differential privacy protection data of the first electronic device, based on a result of identifying an electronic device that transmitted the first data from among the plurality of electronic devices, and
      control the communication interface to transmit, to the server, the second data of the first electronic device, the second data including the differential privacy modification data of the first electronic device.

19. The first electronic device of claim 18, wherein the processor is further configured to:
   control the communication interface to receive the data for requesting the first data and receive information about a noise level set based on pieces of identification information of the plurality of electronic devices, wherein the information about the noise level includes information about a sum of pieces of first differential privacy protection data to be received by the server from respective ones of the plurality of electronic devices,
   generate the first differential privacy protection data of the first electronic device, based on the information about the sum of the pieces of first differential privacy protection data and a weight value of the first electronic device, and
   control the communication interface to transmit, to the server, the first data of the first electronic device, the first data including the first differential privacy protection data of the first electronic device.

20. The first electronic device of claim 19, wherein the processor is further configured to:
   control the communication interface to receive, from the server, identification information of the electronic device that transmitted the first data from among the plurality of electronic devices and
   generate the differential privacy modification data of the first electronic device, based on the information about the sum of the pieces of first differential privacy protection data, the identification information of the electronic device that transmitted the first data, and the weight value of the first electronic device, and
   wherein the sum of the pieces of first differential privacy protection data to be received by the server from the respective ones of the plurality of electronic devices is equal to a sum of pieces of second differential privacy protection data obtained via modification using pieces of differential privacy modification data to be received by the server from the respectively ones of the plurality of electronic devices.

* * * * *